United States Patent
Kiilerich Pratas et al.

(10) Patent No.: US 11,812,255 B2
(45) Date of Patent: Nov. 7, 2023

(54) CONGESTION AWARE DRX_ON ADAPTATION IN SIDELINK UNICAST

(71) Applicant: Nokia Technologies Oy, Espoo (FI)

(72) Inventors: Nuno Manuel Kiilerich Pratas, Gistrup (DK); Lianghai Ji, Aalborg (DK); Berthold Panzner, Holzkirchen (DE)

(73) Assignee: Nokia Technologies Oy, Espoo (FI)

(*) Notice: Subject to any disclaimer, the term of this patent is extended or adjusted under 35 U.S.C. 154(b) by 181 days.

(21) Appl. No.: 17/377,334

(22) Filed: Jul. 15, 2021

(65) Prior Publication Data
US 2022/0046648 A1 Feb. 10, 2022

Related U.S. Application Data

(60) Provisional application No. 63/060,909, filed on Aug. 4, 2020.

(51) Int. Cl.
*H04W 4/00* (2018.01)
*H04W 72/52* (2023.01)
*H04W 72/30* (2023.01)
*H04W 92/18* (2009.01)

(52) U.S. Cl.
CPC ........... *H04W 72/52* (2023.01); *H04W 72/30* (2023.01); *H04W 92/18* (2013.01)

(58) Field of Classification Search
CPC ..... H04W 72/52; H04W 72/30; H04W 92/18; H04W 48/16; H04W 72/02; Y02D 30/70
USPC ........................................ 370/329, 330, 328
See application file for complete search history.

(56) References Cited

U.S. PATENT DOCUMENTS

| | | | |
|---|---|---|---|
| 2015/0245295 A1 | 8/2015 | Jha et al. | |
| 2017/0195995 A1 | 7/2017 | Zhu | |
| 2020/0351705 A1* | 11/2020 | Chae | H04W 4/00 |
| 2021/0014893 A1* | 1/2021 | Park | H04W 80/08 |
| 2021/0250957 A1* | 8/2021 | Roth-Mandut | H04W 72/543 |

(Continued)

FOREIGN PATENT DOCUMENTS

| | | |
|---|---|---|
| EP | 3160201 A1 | 4/2017 |
| EP | 3179794 A1 | 6/2017 |
| WO | 2017/196246 A2 | 11/2017 |

OTHER PUBLICATIONS

"WID Revision: NR Sidelink Enhancement", 3GPP TSG RAN Meeting #88e, RP-201385, Agenda : 9.10.3, LG Electronics, Jun. 29-Jul. 3, 2020, 6 pages.

(Continued)

*Primary Examiner* — Chuong T Ho
(74) *Attorney, Agent, or Firm* — Nokia Technologies Oy

(57) ABSTRACT

Methods, apparatuses, systems and computer program products for sidelink communication to operate in a power efficient manner. The method comprises determining, at a user equipment, information related to a sidelink traffic load in a first set of resources. The user equipment is configured with an indication of the first set of resources and an indication of a second set of resources. The method also comprises determining the sidelink traffic load in the first set of resources based, at least partially, on the determined information. The method further comprises, based on the determined sidelink traffic load, determining a third set of resources for monitoring. In addition, the method comprises monitoring the third set of resources.

20 Claims, 11 Drawing Sheets

(56) References Cited

U.S. PATENT DOCUMENTS

| | | | |
|---|---|---|---|
| 2021/0329596 A1* | 10/2021 | Freda | H04W 72/56 |
| 2022/0225468 A1* | 7/2022 | Chae | H04L 5/14 |
| 2022/0330278 A1* | 10/2022 | Hong | H04W 92/18 |
| 2023/0014303 A1* | 1/2023 | Di Girolamo | H04W 72/20 |
| 2023/0053351 A1* | 2/2023 | Cheng | H04W 24/10 |
| 2023/0171843 A1* | 6/2023 | Luo | H04W 68/005 370/310 |

OTHER PUBLICATIONS

"3rd Generation Partnership Project; Technical Specification Group Radio Access Network; Study on LTE Device to Device Proximity Services; Radio Aspects (Release 12)", 3GPP TR 36.843, V12.0.1, Mar. 2014, pp. 1-50.

"3rd Generation Partnership Project; Technical Specification Group Radio Access Network; NR; Study on User Equipment (UE) power saving in NR (Release 16)", 3GPP TR 38.840, V16.0.0, Jun. 2019, pp. 1-74.

"3rd Generation Partnership Project; Technical Specification Group Radio Access Network; Study on evaluation methodology of new Vehicle-to-Everything (V2X) use cases for LTE and NR; (Release 15)", 3GPP TR 37.885, V15.3.0, Jun. 2019, pp. 1-36.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.0.0, Mar. 2020, pp. 1-1048.

"New WID: UE Power Saving in NR", 3GPP TSG RAN Meetings #84, RP-191607, Agenda : 9.4.6, CATT, Jun. 3-6, 2019, 5 pages.

"3rd Generation Partnership Project; Technical Specification Group Radio Access Network; NR; Physical layer procedures for data (Release 16)", 3GPP TS 38.214, V16.1.0, Mar. 2020, pp. 1-151.

"3rd Generation Partnership Project; Technical Specification Group Radio Access Network; NR; Medium Access Control (MAC) protocol specification (Release 16)", 3GPP TS 38.321, V16.0.0, Mar. 2020, pp. 1-141.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

International Search Report and Written Opinion received for corresponding Patent Cooperation Treaty Application No. PCT/IB2021/056415, dated Nov. 19, 2021, 18 pages.

* cited by examiner

```
DRX-Preference-r16 ::=          SEQUENCE {
    preferredDRX-InactivityTimer-r16    ENUMERATED {
        ms0, ms1, ms2, ms3, ms4, ms5, ms6, ms8, ms10, ms20, ms30, ms40, ms50, ms60, ms80,
        ms100, ms200, ms300, ms500, ms750, ms1280, ms1920, ms2560, spare9, spare8,
        spare7, spare6, spare5, spare4, spare3, spare2, spare1} OPTIONAL,
    preferredDRX-LongCycle-r16      ENUMERATED {
        ms10, ms20, ms32, ms40, ms60, ms64, ms70, ms80, ms128, ms160, ms256, ms320, ms512,
        ms640, ms1024, ms1280, ms2048, ms2560, ms5120, ms10240, spare12, spare11, spare10,
        spare9, spare8, spare7, spare6, spare5, spare4, spare3, spare2, spare1 } OPTIONAL,
    preferredDRX-ShortCycle-r16     ENUMERATED {
        ms2, ms3, ms4, ms5, ms6, ms7, ms8, ms10, ms14, ms16, ms20, ms30, ms32,
        ms35, ms40, ms64, ms80, ms128, ms160, ms256, ms320, ms512, ms640, spare9,
        spare8, spare7, spare6, spare5, spare4, spare3, spare2, spare1 } OPTIONAL,
    preferredDRX-ShortCycleTimer-r16    INTEGER (1..16)  OPTIONAL
}
```

FIG. 2

710 When only the Main DAR resources are active
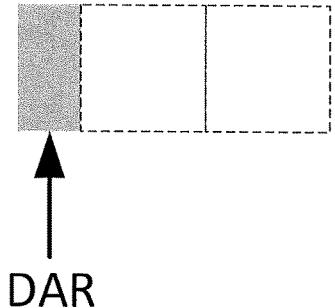
DAR transmission
720 When the Load Activated set of resources are active
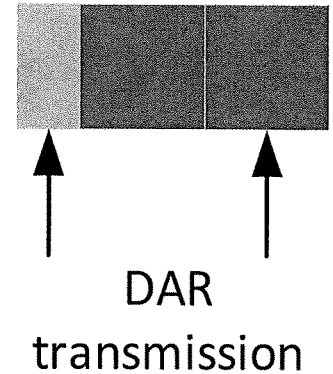
DAR transmission
FIG. 7

CONGESTION AWARE DRX_ON ADAPTATION IN SIDELINK UNICAST

BACKGROUND

Technical Field

The example and non-limiting embodiments relate generally to sidelink communication and, more particularly, to operation in a power efficient manner.

Brief Description of Prior Developments

It is known, for a user equipment in communication with a network or another user equipment, to make use of discontinuous reception to enable power savings.

BRIEF DESCRIPTION OF THE DRAWINGS

The foregoing aspects and other features are explained in the following description, taken in connection with the accompanying drawings, wherein:

FIG. 2 is a diagram illustrating features as described herein;

FIG. 7 is a diagram illustrating features as described herein;

DETAILED DESCRIPTION OF EMBODIMENTS

Figure 1:
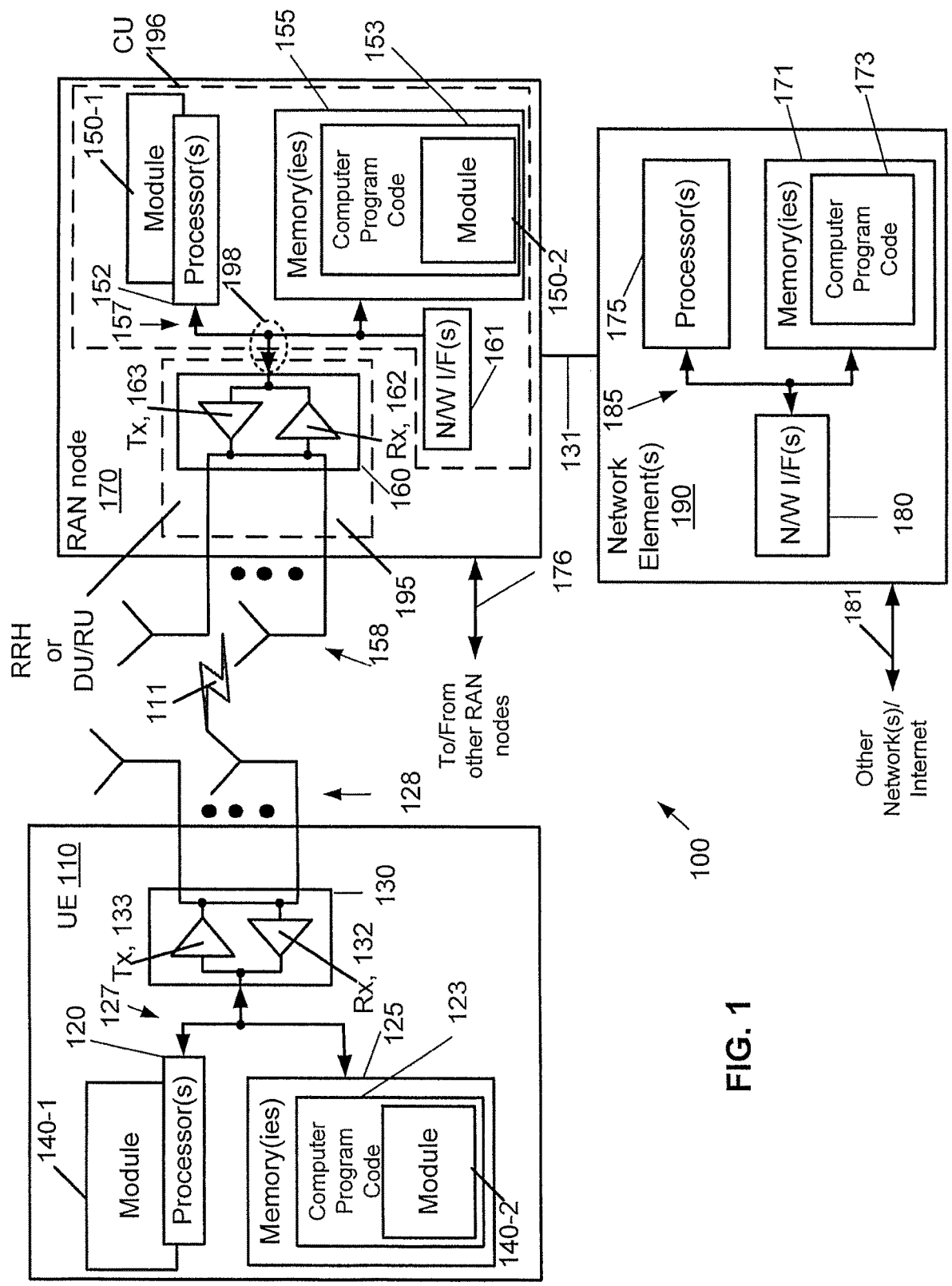
FIG. 1 is a block diagram of one possible and non-limiting exemplary system in which the exemplary embodiments may be practiced.

The following abbreviations that may be found in the specification and/or the drawing figures are defined as follows:

3GPP third generation partnership project
5G fifth generation
5GC 5G core network
AMF access and mobility management function
BWP bandwidth part
CBR channel busy ratio
CRC cyclic redundancy check
CSI-RS channel state information reference signal
CU central unit
D2D device-to-device
DAR DRX alignment request
DCI downlink control information
DCP DCI with CRC scrambled by PS-RNTI
DL downlink
DRX discontinuous reception
DRX-OFF sleep period
DRX-ON active period
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
IE information element
I/F interface
IoT Internet of Things
L1 layer 1
LTE long term evolution
MAC medium access control
MME mobility management entity
MTC machine type communication
MWUS MTC wake up signal
NB-IoT narrow bandwidth Internet of Things
ng or NG new generation
ng-eNB or NG-eNB new generation eNB
NR new radio
N/W or NW network
NZP non-zero power
PC5 interface for direct communication between UEs
PDCP packet data convergence protocol
PDCCH physical downlink control channel
PDSCH physical downlink shared channel
PHY physical layer
ProSe proximity service
PSCCH physical sidelink control channel
PSDCH physical sidelink discovery channel
PS-RNTI power saving RNTI
PUSCH physical uplink shared channel
QCL quasi co-location
QoS quality of service
RAN radio access network
RF radio frequency
RLC radio link control
RNTI radio network temporary identifier
RS reference signal
RSSI received signal strength indicator
RRH remote radio head
RRC radio resource control
RU radio unit
Rx receiver
SCI sidelink control information
SDAP service data adaptation protocol
SGW serving gateway
SL sidelink
SL-CBR sideline channel busy ratio
SL-DFS sidelink DRX-ON filtering signal
SLIV start and length indicator
SMF session management function
SRS sounding reference signal
TDRA time domain resource assignment
TS technical specification
Tx transmitter
UE user equipment (e.g., a wireless, typically mobile device)
UL uplink
UPF user plane function
Uu interface between gNB and UE
V2X vehicle-to-everything VRU vulnerable road user
WI work item (package in 3GPP)
WUS wake up signal Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

Although not illustrated in FIG. 1, the UE 110 may also communicate with other UEs via short range communication technologies, such as Bluetooth®. If wireless communication with a network is unavailable or not possible, or in addition to network communication, the UE 110 may be capable of sidelink communication with other UEs.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So, if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions. In addition, various embodiments of the user equipment 110 can include, but are not limited to, devices integrated into vehicles, infrastructure associated with vehicular travel, wearable devices used by pedestrians or other non-vehicular users of roads, user equipment unrelated to traffic users, and user equipment configured to participate in sidelink scenarios, such as public safety user equipment and/or other commercial user equipment.

Features as described herein generally relate to, while not limited to, new radio (NR) sidelink (SL) power savings. For example, NR SL methods may be implemented to provide communication between a vehicle and a network, infrastructure(s), other vehicle(s), or other road user(s) in the surrounding/immediate area. Such communication may enable proximity service (ProSe), or transmission of information about the surrounding environment, between devices in close proximity for example device-to-device (D2D) communication technology. Such direct communication may be available even when network coverage is unavailable. Additionally or alternatively, NR SL methods may be implemented in scenarios unrelated to traffic users, such as public safety scenarios and/or commercial scenarios. Enhancements to sidelink unicast procedures may be configured to provide power savings in these vehicle-to-everything (V2X) and other use cases. It should be noted that enhancements configured to provide power savings in sidelink procedures may not be limited to unicast procedures; a person of ordinary skill in the art would understand that the present disclosure may also relate to sidelink groupcast, multicast, and/or broadcast procedures as well.

In the present disclosure, there may be disclosed example embodiments configured to enable efficient sidelink resource use while being robust to variable sidelink traffic loads and ensuring that the resources being used for the transmission and reception of DRX alignment requests are known to the involved SL UEs. In addition, there may also be disclosed example embodiments configured to enable a sidelink UE with a sidelink DRX-related configuration to wake up to monitor a minimal amount of resources by considering the variable sidelink traffic loads, which contributes to power saving at the considered sidelink UE.

LTE SL introduced a physical sidelink discovery channel (PSDCH) to enable ProSe direct communication and ProSe direct discovery between SL UEs. Information regarding PSDCH resources was made available via network configuration, for example through SystemInformationBlockType19 in TS36.331, or via pre-configuration for UEs out-of-coverage. This discovery channel was not introduced in NR SL (as per Rel. 16), since the main use case in Rel. 16 for NR SL is V2X, where "discovery" between devices is done via broadcast messages over common SL resource pools, with the assumption that any SL Rx UE will always be monitoring the resource pool without sidelink DRX related configuration.

During 3GPP Rel. 16, and previous releases in the form of study items, different power saving mechanisms for application in the Uu interface between UE(s) and gNB were discussed and specified. These discussions included the introduction of the UE's preferred DRX parameters, which may be indicated to the network, for example via the UEAssistanceInformation IE. Referring now to FIG. 2, illustrated are some possible contents of this information element (IE), including preferredDRX-InactivityTimer-r16, preferredDRX-LongCycle-r16, preferredDRX-ShortCycle-r16, and preferredDRX-ShortCycleTimer-r16. Additional DRX enhancements mechanisms were discussed for 3GPP Rel. 16, including Wake Up Signals, Go-to-sleep signals, and filtering of unnecessary DRX_ON periods.

In the context of narrow bandwidth Internet of Things (NB-IoT) in LTE, machine type communication (MTC) Wake-up signals (MWUS) may be used to trigger the wake up of an MTC UE. This may be achieved in practice by introducing a Zadoff-Chu signal in specific time and frequency resources that the MTC/NB-IoT UE may monitor with a simple receiver (a very low complexity receiver). If the MWUS is present, the simple receiver may trigger wake-up of the full NB-IoT receiver, which may then monitor the next paging occasion.

In the context of NR, a physical downlink control channel (PDCCH)-based power saving signal/channel may be used to instruct a UE in RRC Connected mode to wake up at the next DRX On-Duration. This signal was defined by 3GPP RAN1 as "DCI with CRC scrambled by PS-RNTI", also called DCP, where "PS" stands for Power Saving and the used downlink control information (DCI) format is 2_6. If a UE does not receive the DCP during the network-defined wake up signal (WUS) occasion(s), or a received DCP does not contain a wake-up indication, the UE may assume that no data will be transmitted/available, and may skip monitoring the PDCCH during the next DRX On-Duration. Thus, power savings may be achieved when no data is present. To minimize false alarms (leading to waking up a UE unnecessarily), the DCP signal may be targeted to a UE-specific identifier, such as the power saving radio network temporary identifier (PS-RNTI). It is noted that the WUS-DCI design was defined in the 3GPP Rel-16 work item on UE power saving in NR (RP-191607) in conjunction with DRX as shown in FIG. 3.

Figure 3:
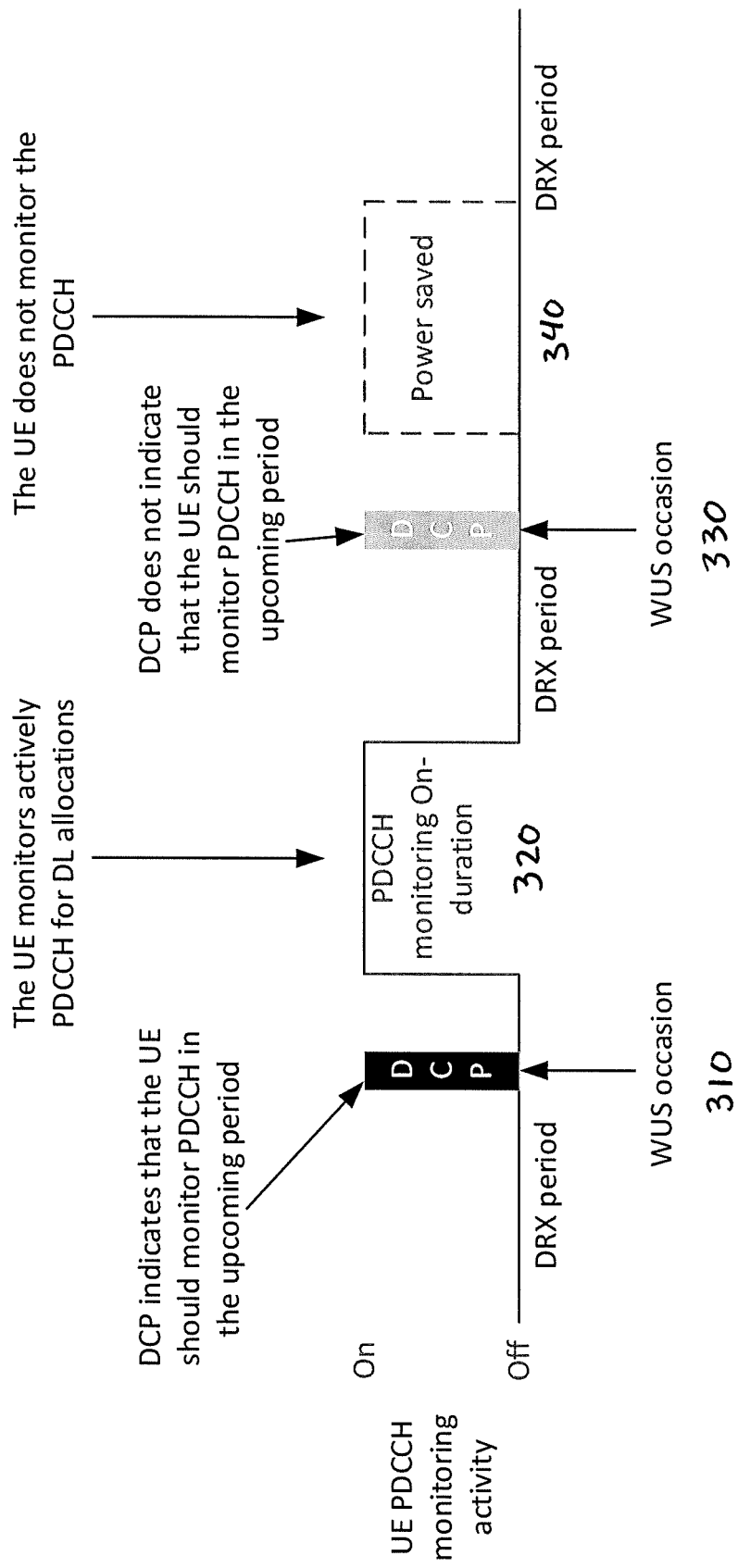
FIG. 3 is a diagram illustrating features as described herein.

Referring now to FIG. 3, illustrated is a scenario demonstrating use of a DCP to indicate whether a UE should monitor the PDCCH. At 310, the UE receives a DCP indicating that the UE should monitor the PDCCH in the upcoming DRX On-duration period. Accordingly, at 320, the UE monitors the PDCCH for downlink (DL) allocations during the next on-duration period. At 330, the UE receives a DCP that does not indicate that the UE should monitor PDCCH in the upcoming on-duration period. Accordingly, at 340, the UE does not monitor the PDCCH during the next potential on-duration period, resulting in a power savings by not performing the monitoring.

Although the general principles of Wake Up Signal and DRX_ON filtering may be applicable in both Uu (network interface) and PC5 (interface for direct communication between UE) interfaces, the signaling issues to be solved in each communication scenario are not the same. Specifically, in the Uu interface, the gNB knows and controls the behavior of the UE, while for SL communications, the gNB does not necessarily have all the information and therefore the power saving mechanisms (i.e. the signaling details) applicable to Uu are not directly applicable to the PC5 interface. For example, the gNB may not have information related to the preferred DRX parameters of a SL UE, what SL UEs are present in the cell or immediate area related to SL communication, and/or what SL UEs are outside the coverage of the gNB but capable of performing sidelink communication with SL UEs within the gNB's coverage. It should also be noted that, in the case of communication over the Uu interface, the only DRX alignment that needs to occur is between the UE and the gNB(s). In the context of SL there needs to be DRX alignment between SL UEs and, in some conditions, between UE(s) and the gNB. Accordingly, different methods for providing power savings in device to device communications may be required than previously specified or discussed in 3GPP Rel. 16.

In 3GPP Rel.17, the work item (WI) on NR Sidelink Enhancements was approved [3GPP RP-201385], where one of the justifications was power saving. Specifically, it was stated in Section 3 that:

"Power saving enables UEs with battery constraint to perform sidelink operations in a power efficient manner. Rel-16 NR sidelink is designed based on the assumption of "always-on" when UE operates sidelink, e.g., only focusing on UEs installed in vehicles with sufficient battery capacity. Solutions for power saving in Rel-17 are required for vulnerable road users (VRUs) in V2X use cases and for UEs in public safety and commercial use cases where power consumption in the UEs needs to be minimized."

An "always-on" mode of sidelink operation may not be desirable in all use cases. Furthermore, in Section 4.1 of 3GPP RP-201385, the following objective was stated regarding power saving:

"1. Sidelink evaluation methodology update: Define evaluation assumption and performance metric for power saving by reusing TR 36.843 and/or TR 38.840 (to be completed by RAN #89) [RAN1]

Note: TR 37.885 is reused for the other evaluation assumption and performance metric. Vehicle dropping model B and antenna option 2 shall be a more realistic baseline for highway and urban grid scenarios.

. . .

3. Sidelink DRX for broadcast, groupcast, and unicast [RAN2]

Define on- and off-durations in sidelink and specify the corresponding UE procedure Specify mechanism aiming to align sidelink DRX wake-up time among the UEs communicating with each other Specify mechanism aiming to align sidelink DRX wake-up time with Uu DRX wake-up time in an in-coverage UE"

Example embodiments of the present disclosure may relate to UE procedures regarding discontinuous reception (DRX) cycles, their alignment, and the resources used to exchange information about that alignment.

In 3GPP Rel. 17, NR SL may be extended to cover V2X use cases where vulnerable road users (VRUs) are present, as well as other non-V2X use cases where energy saving is required and mainly enabled with DRX cycles. The introduction of DRX cycles for SL operation may enable significant power saving by introducing periods (DRX_OFF period) where the SL UEs are not monitoring the resource pools for any incoming transmissions. In other words, during these DRX_OFF periods, the SL UE will not attempt to receive/decode any sidelink transmission, e.g. neither from the physical sidelink control channel (PSCCH) transmission, nor from physical sidelink shared channel (PSSCH).

However, in order for the SL UEs to still be able to communicate with each other while DRX is performed, it may be necessary for the communicating SL UEs to be aware of their peers' respective DRX cycles. More specifically, a SL UE performing the role of transmission (Tx) may need to be aware of when intended receiver UE(s) will be in a DRX_ON period. To achieve this, it may be necessary to establish an initial DRX alignment.

Figure 4:
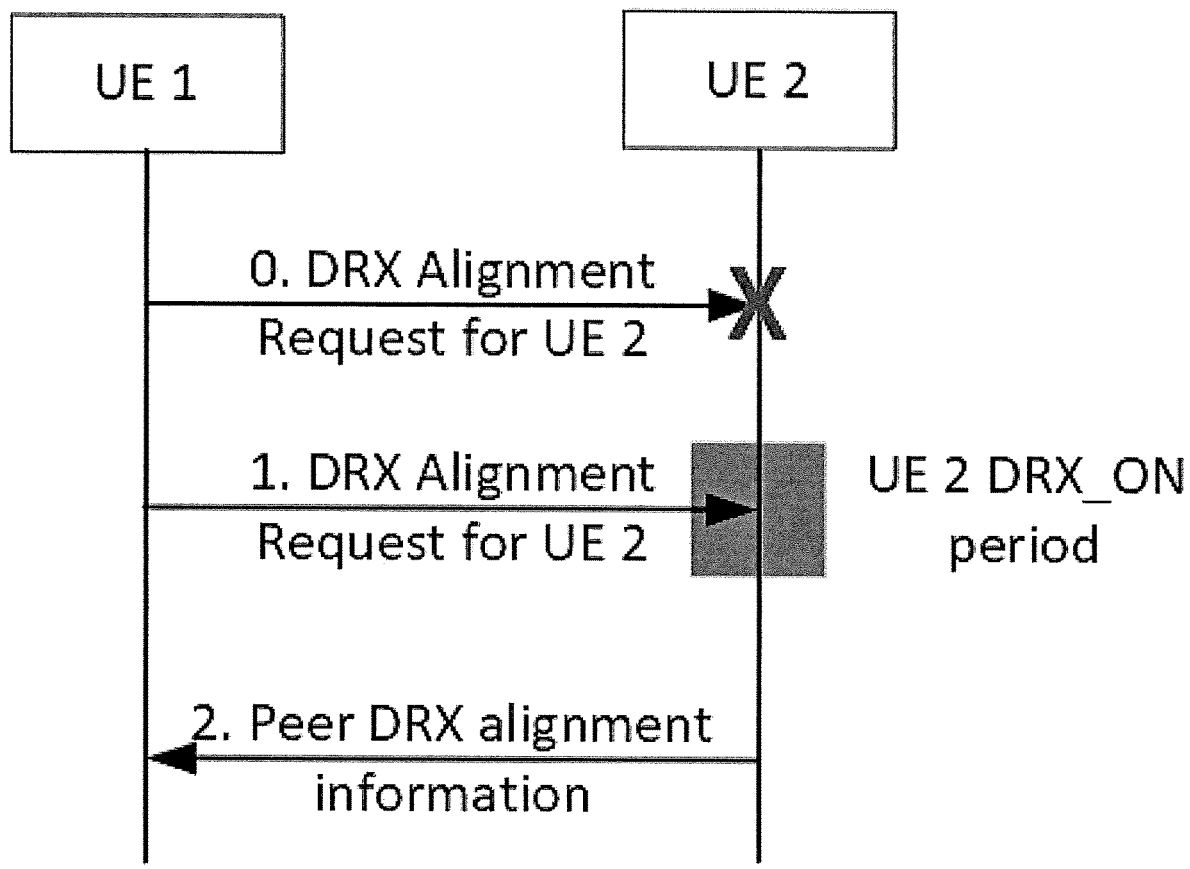
FIG. 4 is diagram illustrating features as described herein.

Referring now to FIG. 4, illustrated is a scenario demonstrating a potential procedure 400, which may be considered a direct DRX alignment, for establishing a DRX alignment between two UEs of a sidelink unicast. It should be noted that the present disclosure is mainly related to sidelink DRX alignment, which is used to transmit/receive with sidelink/PC5; DRX alignment in Uu interface is not generally considered. In this example, DRX alignment may be achieved directly between two UEs in sidelink, i.e. without requesting that a network (NW) perform the alignment. Thus, the illustrated procedure 400 may not require the introduction of a third entity to manage the alignment of DRX cycles between communicating SL UEs. However, it may require that the initiating UE 1 know the time period when UE 2 will be in DRX_ON. Otherwise, UE 1 may need to perform several blind transmission attempts to reach UE 2. As illustrated in FIG. 4, UE 1 does not know when UE2 will be in DRX_ON, so at step 0, the DRX Alignment Request transmitted from UE 1 to UE 2 is unsuccessful. The second blind attempt, at step 1, occurs during UE 2's DRX_ON period, and so is received by UE 2. Accordingly, UE 2 can transmit peer DRX alignment information to UE 1 at step 2. To avoid/reduce making blind transmission attempts to reach UE 2, UE 1 would need to know when UE 2 will be active, i.e. when its DRX_ON period will take place.

It may be assumed that a transmitting or initiating UE may be aware of the ID of its peer UE before transmission of a DRX alignment request, but might not have DRX_ON information of the peer UE. In the example of FIG. 4, UE 1 may be aware of the ID of UE 2 (e.g. due to an indication from application layer) even though it does not know the timing of UE 2's DRX_ON period. Thus, UE 1 may transmit the DRX Alignment Request message together with the ID of UE 2 to initiate the DRX alignment with UE 2, at steps 0 and 1.

In a case where a transmitting or initiating UE is not aware of a peer UE, the initial DRX alignment may be carried out together with, or after, the discovery procedure (e.g. together with or after the communication request message or discovery message). In this case, it may be required that the communication request message or the discovery message of a transmitting or initiating UE be sent during the DRX_ON period of the intended or monitoring UE. Otherwise, the transmitting UE may need to perform several blind transmission attempts to reach the monitoring UE, as the communication request message or the discovery message may be the first message to wake up the monitoring UE and to initiate the DRX alignment procedure.

For simplicity, in the following disclosure, the term "DRX Alignment Request" (DAR) may be used to indicate the first message transmitted by a transmitting or initiating UE to a peer/monitoring/intended UE for initiating the DRX alignment procedure. It should be understood that the first message may be a different message, e.g. a communication request message as mentioned, or a discovery message, etc. Accordingly, use of the term DAR should not be considered as limiting the disclosure to transmission or receipt of DAR messages.

In the following disclosure, the terms "transmitting UE" and "initiating UE," as well as similar terms, may be used interchangeably. Use of one term or the other should not be considered as limiting the disclosure. In addition, the terms "receiving UE" and "monitoring UE," as well as similar terms, may be used interchangeably. Use of one term or the other should not be considered as limiting the disclosure.

In an example embodiment, in order to enable DRX alignment, at least for the very first message (e.g. the DRX Alignment Request message in FIG. 4, a communication request message, or a discovery message), a corresponding channel(s) or known resource(s) or resource pool(s) may be introduced into the NR SL resource pool(s). More specifically, each SL device/UE may be (pre-) configured with certain resources that may be used to send/transmit and receive/monitor for DRX alignment information, which may include a first message for initiating the DRX alignment procedure.

As the use of dedicated resources for only certain type(s) of service may be considered an inefficient design for a communication system, in an example embodiment the resources dedicated for DRX alignment may be very limited, and in order to ensure that both in-coverage and out-of-coverage SL UEs can make use of it, these resources may be configured/implemented as part of the SL (pre-) configuration. A technical effect of limiting the size of the resources dedicated for DRX alignment may be that a monitoring SL UE may only need to monitor a small amount of resources before it returns to the power-saving mode (e.g. DRX_OFF), further reducing UE energy consumption.

It should be noted that the use of static/dedicated resources may have the drawback of not being robust/efficient towards variable loads. For example, if the number of allocated resources is too large, then for low loads there will be low resource usage, since these resources are dedicated to only certain type(s) of service(s) and other service(s) may not use them for transmission. But if the number of allocated resources is relatively small, there may be congestion and, subsequently, either a delay in the time for DRX alignment (via congestion mechanisms) or failure (due to collisions/interference). For example, if there are multiple UEs, e.g. UE-0, UE-1, UE-2, UE-n, in a local area, to carry out their initial SL DRX alignment procedures, each of the UEs needs to send out a first message during the SL DRX_ON period of peer UE(s), as illustrated at step 1 of FIG. 4. When all these UEs are configured with the same set(s) of resources to transmit/receive the first message(s), how many resources should be configured? If the pool/set containing the resources is too large, some resources may be wasted, especially if the number of first messages transmitted by different UEs is very low. However, if the resource pool is too small, there may be a high collision rate if the number of first messages, and/or the number of UEs in the considered area, is very high.

In an example embodiment, the resources allocated for DRX alignment may be adjusted in a flexible manner, which may allow local traffic load needs to be considered and met. In an example embodiment, allocation/activation of the proper amount/number of resources may be performed by estimating the congestion/load level over the resources dedicated for transmitting the information for initiating the DRX alignment in real time, which may reflect the number of first messages and/or the number of UEs (i.e. the value of n in the above example) to some extent.

In an example embodiment, an apparatus may be configured to perform a method to ensure successful DRX alignment between at least two UEs in sidelink under dynamic sidelink traffic conditions. More specifically, in an example embodiment, DRX Alignment Request (DAR) resources allocated for the exchange of DAR(s) may be (pre-) configured and divided into two groups, which may be denoted as "main DAR resources" and "load activated DAR resources". The load activated DAR resources may comprise one or multiple sets of resources. While these groups will be referred to according to these terms in the following disclosure, it should be understood that alternative terms may be used to identify these groups.

In an example embodiment, initiation of sidelink DRX alignment between two peer UEs of a sidelink unicast may comprise configuration and/or pre-configuration of the UEs with main DAR resources and load activated DAR resources, including the associated sidelink traffic load (e.g. SL-CBR, or another metric for sidelink traffic load) threshold(s) which indicate when to activate one or more sets of resources from the set of load activated DAR resources and when to deactivate one or more of the sets. The main DAR resources may be configured or reserved for a SL UE to transmit/receive a message to/from a peer SL UE without knowing the UE-specific SL DRX configuration of the peer UE beforehand, e.g. a message to initiate the sidelink discontinuous reception alignment.

In some other embodiments, the main DAR resources may also be reusable for transmission of other message types, for example, (normal) data transmission. In this case, a SL UE may further estimate the traffic load of other message types and derive the traffic load of DAR messages by extracting the traffic load of other message types from the overall traffic load, if the main DAR resources are configured to transmit at least part of the transmissions associated with the DAR messages. In addition, if the main DAR resources are configured to transmit a sequence/signal, e.g. physical layer sequence/signal, a SL UE may still estimate the number of sequences/signals transmitted over the main DAR resources, by considering the transmissions of other message types over the main DAR resources as interference.

The load activated DAR resources may be one or more set(s) of resources which may be used for a SL UE to transmit/receive a message to/from a peer SL UE without knowing the UE-specific SL DRX configuration of the peer UE beforehand, e.g. a message to initiate the sidelink discontinuous reception alignment, and/or other messages, for example, (normal) data transmission. In other words, the load activated DAR resources are not limited to use for transmitting/receiving a message for initiating sidelink DRX alignment.

According to the configured traffic load (e.g. SL-CBR) threshold(s), the traffic load level measured on the main DAR resources, and, optionally, one or more configurable traffic load threshold offset(s) a, a Tx UE may transmit the DAR on only the main DAR resources, or on both main DAR resources and load activated DAR resources. When the traffic load level is low, such that the load activated DAR resources are not activated or are deactivated, the load activated DAR resources not used for DAR transmission may instead be shared/reused for transmitting non-DAR messages, i.e. normal traffic (for example, data packets).

Figure 5:
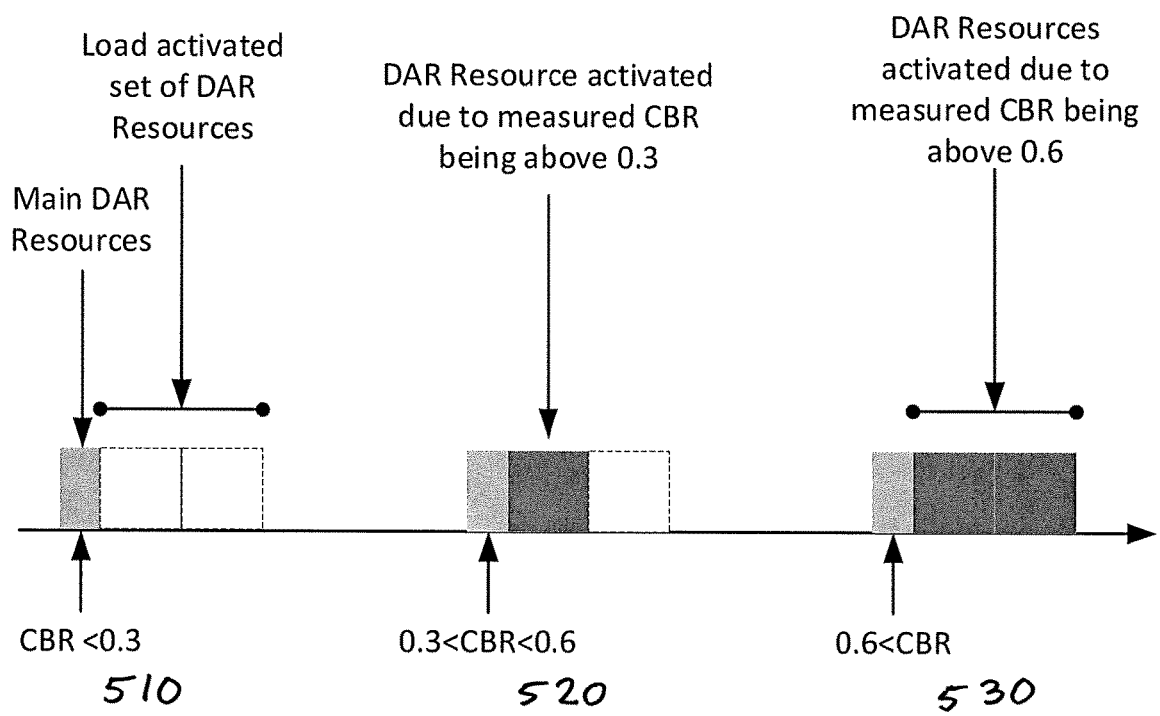
FIG. 5 is a diagram illustrating features as described herein.

Referring now to FIG. 5, illustrated is an example in which DRX Alignment Request (DAR) resources are activated depending on a level of a measured sidelink channel busy ratio (SL-CBR). At 510, a measured CBR of the main DAR resources is less than 0.3. Accordingly, in this example, DAR may be transmitted/detected using resources of the main DAR resources group and not of the load activated DAR resources set of resources. At 520, a measured CBR of the main DAR resources is between 0.3 and 0.6. Accordingly, in this example, DAR may be transmitted/detected using resources of the main DAR resources group and/or a resource from one or multiple resource set(s) of the load activated DAR resources, as some of the DAR resource set(s) of the load activated DAR resources may be activated when the measured CBR falls into the indicated range. At 530, a measured CBR of the main DAR resources is more than 0.6. Accordingly, in this example, DAR may be transmitted/detected using resources of the main DAR resources group and/or a resource from one or multiple resource set(s) of the load activated DAR resources, as some of the DAR resources set(s) of the load activated DAR resources may be activated when the measured CBR falls into the indicated range. As illustrated in FIG. 5, as the SL-CBR increases, a greater number of the (pre)configured DAR resources may be used/activated to transmit/detect DAR. It should be understood that the thresholds illustrated in FIG. 5 are for purposes of illustration, and should not be considered as limiting the number of resources in either group, nor the thresholds used for activation/deactivation of one or multiple resource set(s) of the load activated DAR resources.

The main DAR resources may, by default, always be allocated to the transmission/reception of DARs, regardless of the sidelink traffic load (e.g. SL-CBR) measured in those resources. Alternatively, the main DAR resources may only be configured for transmission/reception of a signal/sequence/part of the transmission associated with DAR other than complete DAR, as further described below.

In contrast, one or multiple resource set(s) of the load activated DAR resources might only be activated (used for the transmission/reception of DRX alignment requests) based on traffic load (e.g. SL-CBR, CBR, etc.) measurement over the main DAR resources, e.g. when the measured traffic load is above a certain threshold. In other words, by default, the load activated DAR resources are not dedicated to transmit or receive DAR only.

The main DAR resources and/or load activated DAR resources may be configured at the SL UE by pre-configuration, UE-implementation and/or by NW configuration, e.g. via dedicated signaling or broadcasted system information block. The main DAR resources and the load activated DAR resources may be configured either consecutively or non-consecutively in the time and/or frequency domains.

There may be one or multiple set(s)/pool(s) (e.g. S-1, S-2, . . . , S-N) of load activated DAR resources which may be activated according to different traffic loads (e.g. CBR-1, CBR2, . . . , CBR-N, whose values have an increased order). Thus, in an example, the sets/pools S-1, S-2, . . . , S-M are activated if the traffic load exceeds the M-th traffic load threshold (e.g. the measured CBR is larger than CBR-M). As another example, referring now to FIG. 5, at 530 the measured CBR reaches the threshold of 0.6. Accordingly, the load activated DAR resources associated with the previous threshold, 0.3 at 520, are activated as well as the load activated DAR resources associated with the threshold of 0.6. A SL UE may transmit the DAR message by selecting a resource from the activated set(s)/pool(s) of the load activated DAR resources. The selection may be done by using, e.g. a random selection approach, a sensing based approach, a partial sensing based approach, etc.

FIG. 5 illustrates an example in which load activated DAR resources are activated according to thresholds for a measured traffic load (e.g. CBR). However, a SL receiving UE may be further configured with a traffic load offset value σ, which may be used in addition to the configured threshold(s) to determine the activated resource pools/sets of the load activated DAR resources on which DAR message(s) may be received. In other words, the load activated DAR resources for receiving DAR message(s)

may be activated based on a combination of a measured SL-CBR value obtained from the main DAR resources and a traffic load offset value σ (i.e. measured-CBR+σ) in order to determine the resource set(s) to monitor for/receive DAR message(s). A technical effect of the use of a traffic load offset value σ may be compensation for a difference between the CBR measured by a Tx UE and that measured by an Rx UE. For example, if the DAR initiator/Tx UE observes a higher CBR measurement over the main DAR resources than the DAR monitor/Rx UE (e.g. due to a hidden problem), the DAR initiator/Tx UE may activate more load activated DAR resources than the DAR monitor/Rx UE is monitoring. In such a case, the configured traffic load offset may enable a guard interval for the monitoring UE to activate more load activated DAR resources and receive the DAR message(s).

It should be noted that, if the Tx UE measures a lower sidelink traffic load than the Rx UE, such that the Rx UE activates more load activated DAR resources for monitoring than the Tx UE activates for transmitting, use of a traffic load offset value σ may be unnecessary, as the Rx UE will still be monitoring enough resources to receive the DAR transmitted by the Tx UE; the Rx UE will be unlikely to miss DAR. However, it may be useful to ensure that the amount of resources used for transmission and the amount of resources used for monitoring are similar in order to avoid unnecessary use of resources.

Alternatively/additionally, a SL transmitting UE may be further configured with a traffic load offset value σ, which may be used in addition to the configured threshold(s) to determine the activated resource pools/sets of the load activated DAR resources to transmit DAR message(s). In other words, the load activated DAR resources to transmit DAR message(s) may be activated based on a combination of a measured SL-CBR value obtained from the main DAR resources and a traffic load offset value σ, (i.e. measured-CBR-σ), in order to determine the resource set(s) to be activated to transmit DAR message(s). Similarly, the configured traffic load offset may enable a guard interval for the transmitting UE to activate fewer load activated DAR resources for transmitting the DAR message(s). As in the previous example, it may be assumed that the sidelink traffic load measured by the Tx UE is greater than the sidelink traffic load measured by the Rx UE.

Figure 6:
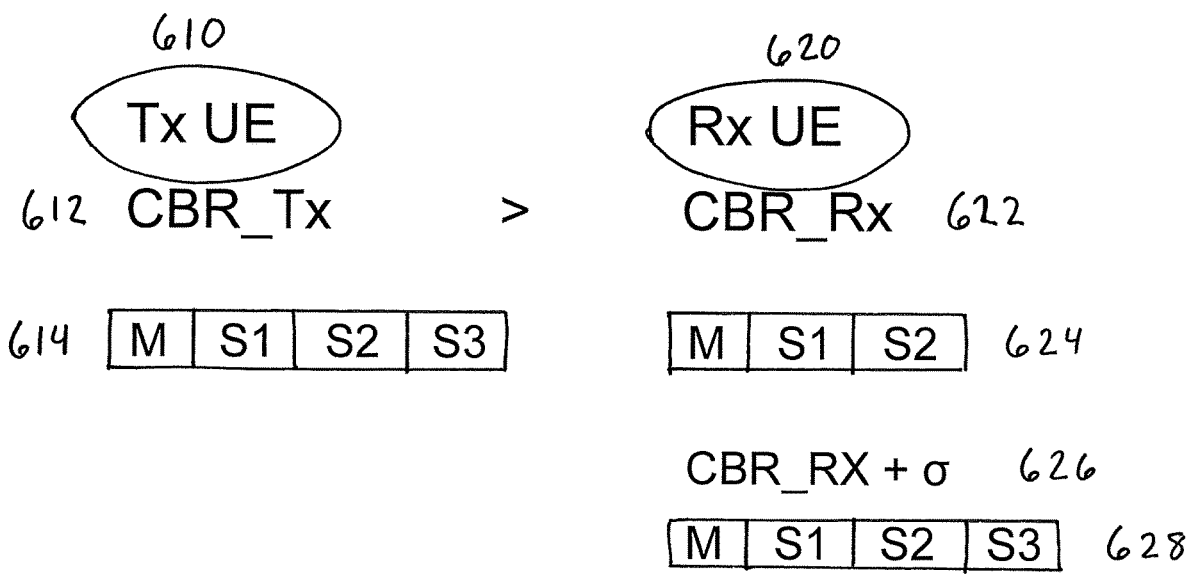
FIG. 6 is a diagram illustrating features as described herein.

Referring now to FIG. 6, in an example there may be two SL UEs, Tx UE 610 transmitting the DAR message and Rx UE 620 receiving the DAR message. Based on the local traffic load measurement of/by Tx UE 610, CBR_Tx 612, the Tx UE 610 may activate one or more load activated DAR resources sets, e.g. S1, S2, and S3, at 614. However, the Rx UE 620 may measure CBR_Rx 622, which might be lower than CBR_Tx 612, as illustrated. Thus, based on CBR_Rx 622, Rx UE 620 may activate fewer of the load activated DAR resources sets, e.g. S1, S2, at 624. This may be true if CBR_Rx 622 does not reach a configured threshold required to activate set S3. In this case, if Tx UE 610 selects to transmit its DAR message over a resource from resource set S3, the Rx UE will fail in receiving the DAR message because it is not monitoring S3 resources. This issue may be avoided through the use of a traffic load offset value σ. If the Rx UE 620 adds traffic load offset value σ to the measured CBR_Rx at 626 (CBR_Rx+σ) and compares this value to the configured threshold(s) for the load activated DAR resources instead of CBR_Rx 622, the Rx UE 620 may activate more load activated DAR resource sets, e.g. S1, S2, S3, at 628, which may enable the Rx UE 620 to successfully receive the DAR message from the Tx UE 610 if transmitted with S3.

In an example embodiment, the SL UEs may be configured with multiple values for σ, each of which may be associated with different traffic load conditions. For example, the SL UE may select one value for σ, e.g. by considering its measured traffic load. As one simple example, with an increased traffic load measured over the main DAR resources, the value of σ may also increase.

In an example embodiment, a SL Tx UE may transmit normal traffic (i.e. the non-DAR messages, such as data packets) over the unactivated set(s)/pool(s) of load activated DAR resources, e.g. based on the measured traffic load level over the main DAR resources. Accordingly, a SL Rx UE may receive normal traffic (i.e. the non-DAR messages) over the unactivated set(s)/pool(s) of load activated DAR resources, e.g. based on its measured traffic load level over the main DAR resources. It should be noted that both a transmitting UE and a receiving UE may perform traffic load measurements (e.g. CBR measurements). Based on the traffic load measurements, a transmitting UE may determine which (pre)configured resources may be used for transmission of DAR and/or normal traffic. Based on the traffic load measurements, a receiving UE may determine which (pre)configured resources may be used for reception of DAR and/or normal traffic (e.g. data packets).

In an example embodiment, the configured traffic load threshold value σ may be used to derive the unactivated sets/pools of load activated DAR resources that can be reused to transmit the normal traffic/non-DAR messages. For example, the SL Tx UE may use "measured-CBR+σ" to determine the reusable sets/pools. Thus, if two SL UEs observe different CBR measurement over the main DAR resources, this offset enables a guard interval to protect the DAR message(s) transmitted in the load activated DAR resources. For example, if a Tx UE measures a lower CBR than an Rx UE, by using "measured-CBR+σ" to determine the reusable sets/pools, Tx UE might not transmit normal traffic in a set of resources that the Rx UE may be monitoring for DAR.

In another example embodiment, the SL Tx UE may be configured with restrictions regarding which sidelink traffic(s) may be transmitted in the unactivated load activated DAR resources, e.g. based on traffic characteristics and/or QoS requirements. For example, only dynamic traffic may be allowed to be transmitted in the unactivated load activated DAR resources, in order to avoid a UE occupying the load activated DAR resources periodically. Alternatively, only high priority traffic may be allowed to be transmitted in the unactivated load activated DAR resources, which may provide the advantage that the high-priority traffic may hit the DRX on-period of the peer UE(s).

In order to ensure that all SL UEs in a local area are experiencing the same measured traffic load (e.g. CBR) in the main DAR resources, a UE when transmitting a DAR in the load activated DAR resources also transmits in the main DAR resources, whether the main DAR resources are configured for transmission of DAR, partial DAR, or a non-DAR signal/sequence. By transmitting in the main DAR resources, other UEs will be able to obtain an accurate estimation of the traffic load over the main DAR resources.

It should be noted that the main DAR resources may be configured to transmit DAR, parts of DAR in addition to other traffic, and/or non-DAR traffic only. If the main DAR resources are configured to transmit a layer-1 signal/sequence, the whole DAR transmission may take place in the load activated DAR resources instead of in the main DAR resources. Where the main DAR resources are configured to transmit whole DAR, SCI+data payload may be transmitted in the main DAR resources. Where the main DAR resources are configured to transmit part of DAR, at least part of the SCI may be transmitted in the main DAR resources while the rest of DAR (i.e. data payload+remaining part of SCI) may be transmitted over (activate) load activated resources. Where the main DAR resources are only configured to transmit a layer-1 signal/sequence, the whole DAR message may be transmitted over the (activated) load activated DAR resources.

In an example embodiment, the activation of the load activated DAR resources might not be explicitly signaled to the SL UEs monitoring the main DAR resources. Instead, the SL UEs may activate the load activated DAR resources based on the measured sidelink traffic load at the main DAR resources. In other words, the measured sidelink traffic load level may act as a trigger for the activation of the load activated DAR resources for all the SL UEs in the vicinity.

After the load conditions have been resolved (i.e. after a high volume of DARs have been exchanged), the traffic at the main DAR resources may decrease. After a specific CBR threshold is passed, corresponding load activated DAR resources may be deactivated (i.e. set(s) of resources corresponding to the threshold(s) may no longer be used for the transmission/reception of DAR, and may instead be released for normal SL traffic usage).

Referring now to FIG. 7, illustrated are examples of the behavior of an SL UE when transmitting DAR, dependent on whether the load activated DAR resources are activated. In this example, the main DAR resources are configured to carry DAR messages, but it should be noted that, in other examples, the main DAR resources might not be so configured. In FIG. 7, at 710, the load activated DAR resources are not activated. Accordingly, DAR is transmitted via the main DAR resources. At 720, the load activated DAR resources are activated. Accordingly, DAR is transmitted via a resource from the main DAR resources and a resource from the load activated DAR resources. For example, as illustrated in FIG. 7 at 720, DAR may be transmitted with a resource chosen from the main DAR resources and a resource chosen from the second set of (activated) load activated DAR resources. In another example, a resource may additionally or instead be selected from the first set of (activated) load activated DAR resources to transmit DAR. In an example embodiment, the SL UE may transmit the same DAR in the main DAR resources as in the load activated DAR resources when the load activated DAR resources are activated. If the traffic load is low enough that the load activated DAR resources are not activated, the SL UE may only transmit DAR in the main DAR resources.

The purpose of transmitting always in the main DAR resources is two-fold: (i) it may ensure that a SL UE that has just arrived/turned on in the considered area only has to monitor, by default, the main DAR resources, and may further activate additional load activated DAR resources based on the measured traffic load; and (ii) it may ensure that only the main DAR resources traffic load level needs to be monitored, thus avoiding any mismatches that might occur if some SL UEs were monitoring the CBR level at the main DAR resources while other SL UEs were monitoring the CBR level at both the main DAR resources and load activated DAR resources.

In an alternative example embodiment, the SL UE may transmit a (pre-) configured signal/sequence (e.g. a Zadoff-Chu sequence with a configured UE-specific cyclic shift) in the main DAR resources instead of or in addition to DAR, and transmit DAR in the (activated) load activated DAR resources. Thus, based on the number of received/detected signals/sequences in the main DAR resources, a monitoring UE may derive the traffic load. In other words, the Rx UE may be able to measure the main DAR resources, at least some of which are used to transmit a configured signal/sequence, and determine which load activated DAR resources should be monitored in order to detect DAR. In this example embodiment, besides the main DAR resources, the Tx UE may be configured to activate at least one default set/pool of load activated DAR resources to transmit the DAR. The activated default set/pool of load activated DAR resources to transmit the DAR may be (pre-) configured at the Tx UE, and it may be activated even if the measured traffic load is very low, i.e. even if a lowest threshold is not met.

In an alternative example embodiment, the SL UE may transmit at least part of the transmission associated with the DAR (e.g. at least part of the sidelink control information (SCI)) in the main DAR resources, rather than the complete DAR, and transmit the rest of the DAR (e.g. remaining part of SCI+data payload/sidelink data information) in the activated load activated DAR resources. Thus, based on the number of received/detected SCIs or measured CBR in the main DAR resources, a monitoring UE may derive the traffic load. In other words, the Rx UE may be able to measure the main DAR resources, at least some of which are used to transmit part of the transmission associated with the DAR, and determine which load activated DAR resources should be monitored in order to detect all parts of DAR. For example, the information transmitted over the main DAR resources (e.g. part of SCI) may further indicate the resources of the load activated DAR resources the Rx UE should activate for monitoring, and accordingly receive the remaining part of the transmission (e.g. other parts of SCI, and/or data payload). In this example embodiment, besides the main DAR resources, the Tx UE may be configured to activate at least one default set/pool of load activated DAR resources to transmit the remaining part of the transmission associated with the considered DAR. The activated default set/pool of load activated DAR resources to transmit the DAR may be (pre-) configured at a SL UE, and it may be activated even if the measured traffic load is very low, i.e. even if a lowest threshold is not met.

It should be noted that resource selection from the main DAR resources and/or the (activated) load activated DAR resources for transmission/monitoring may be based on any resource selection schemes known to a person of ordinary skill in the art.

It should be noted that, for a DRX alignment mechanism according to a disclosed example embodiment of the present disclosure, the behavior of an SL UE depends on whether the SL UE takes the role of DAR initiator (i.e. the SL UE that transmits the DAR) or DAR monitor (i.e. the SL UE that receives the DAR). With respect to FIGS. 8 and 9, "SL-CBR" is used to represent the measured sidelink traffic load, although other metrics are possible. With respect to FIGS. 8 and 9, the parameter "threshold" indicates the configured traffic load threshold to activate at least one set of resources of the load activated DAR resources.

Figure 8:
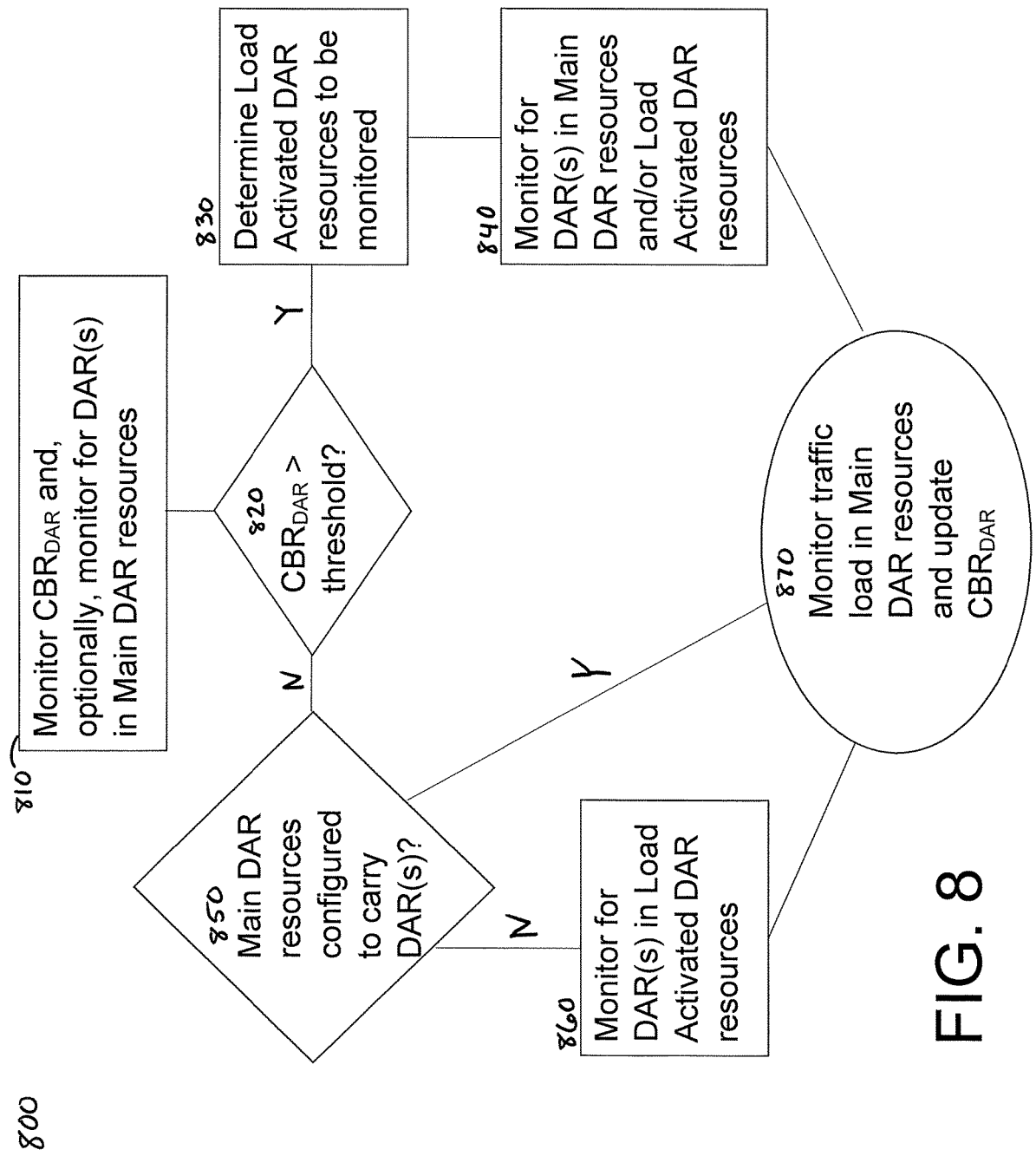
FIG. 8 is a flowchart illustrating steps as described herein.

Referring now to FIG. 8, illustrated is the behavior of a DAR monitor SL UE. At 810, the Rx UE may monitor or measure the traffic load (e.g. CBR) in the main DAR resources, e.g. denoted as $CBR_{DAR}$. For example, this monitoring may be performed by measuring the sidelink RSSI at each resource of the main DAR resources. In an example embodiment, the measurement at each resource of the main DAR resources may last for a period of time, following an average moving window approach. This time period may be (pre-) configured. In addition, at 810, the Rx UE may also monitor for incoming DARs in main DAR resources, if the main DAR resources are configured to carry DARs. The manner in which the Rx UE monitors or measures the traffic load in the main DAR resources may be influenced by whether or not the main DAR resources are configured to carry DAR/parts of DAR. For example, if the main DAR resources are configured to carry non-DAR signals/sequences, measuring the traffic load may comprise counting the number of detected layer-1 signals/sequences. If the main DAR resources are configured to carry at least part of the DAR, measuring the traffic load may involve considering the CBR due to transmission of DAR messages.

At 820, the RX UE may determine whether the measured traffic load is above at least one threshold. This determination may be performed before the next set of DAR resources (i.e. main DAR resources and/or load activated DAR resources). This may be determined with reference to a traffic load offset, as described above. Alternatively, a Tx UE may perform the comparison and transmit a message to the Rx UE indicating the outcome of the comparison. In some embodiments, this message may be transmitted in the main DAR resources. If the $CBR_{DAR}$>threshold, at 830 the Rx UE may determine the set(s) of the load activated DAR resources to be activated for monitoring based on $CBR_{DAR}$, if one or multiple sets of load activated DAR resources are configured. Alternatively, the Rx UE may determine set(s) of load activated DAR resources to be activated for monitoring DAR based on a message received from a Tx UE indicating the set(s) of load activated DAR resources that the Tx UE has activated for transmission of DAR. At 840, the Rx UE may monitor for incoming DARs in main DAR resources and/or the determined/activated load activated DAR resources. The monitoring for incoming DARs may occur during the next sidelink DRX on duration period. It should be noted that, if the Rx UE monitors for incoming DAR in the main DAR resources at 810, the Rx UE may not need to monitor for incoming DARs in resources of the main DAR resources at 840, e.g. depending on if the load activated DAR resources appears before the next main DAR resources in time domain. After the monitoring is performed, the Rx UE may monitor the traffic load in the main DAR resources and update $CBR_{DAR}$ accordingly, at 870. It should be noted that while FIG. 8 illustrates a single loop of an example embodiment for simplicity, the step at 870 may be considered the same as the step at 810, such that the loop is repeated. Once a DAR message has been successfully received, the receiving DAR may stay awake and proceed to perform, for example, sidelink alignment or a procedure for providing its SL DRX configuration information. An RX UE may also continue to monitoring the next main DAR resources to receive further message(s) from other sidelink device(s).

If, at 820, the Rx UE determines that $CBR_{DAR}$<threshold, at 850, further action of the Rx UE may depend upon whether the main DAR resources are configured to carry DARs. If the main DAR resources are configured to carry DARs, the Rx UE may have already monitored for incoming DAR in the main DAR resources at 810. If monitoring for DAR in the main DAR resources has already occurred at 810, the Rx UE may proceed to step 870 and monitor the traffic load in the main DAR resources and update $CBR_{DAR}$ accordingly. As noted above, step 870 may be the same as step 810, such that the loop cycles through again. If the main DAR resources are configured to carry only signals/sequences/part of the transmission associated with DAR, the Rx UE may monitor for incoming DARs or the remaining parts of the transmission associated with DARs in the configured/default set of load activated DAR resources at 860. It should be noted that the Rx UE may also monitor for incoming DAR in main DAR resources at 860. After the monitoring is performed, the Rx UE may monitor the traffic load in the main DAR resources and update $CBR_{DAR}$ accordingly, at 870. As noted above, step 870 may be the same as step 810, such that the loop cycles through again.

Figure 9:
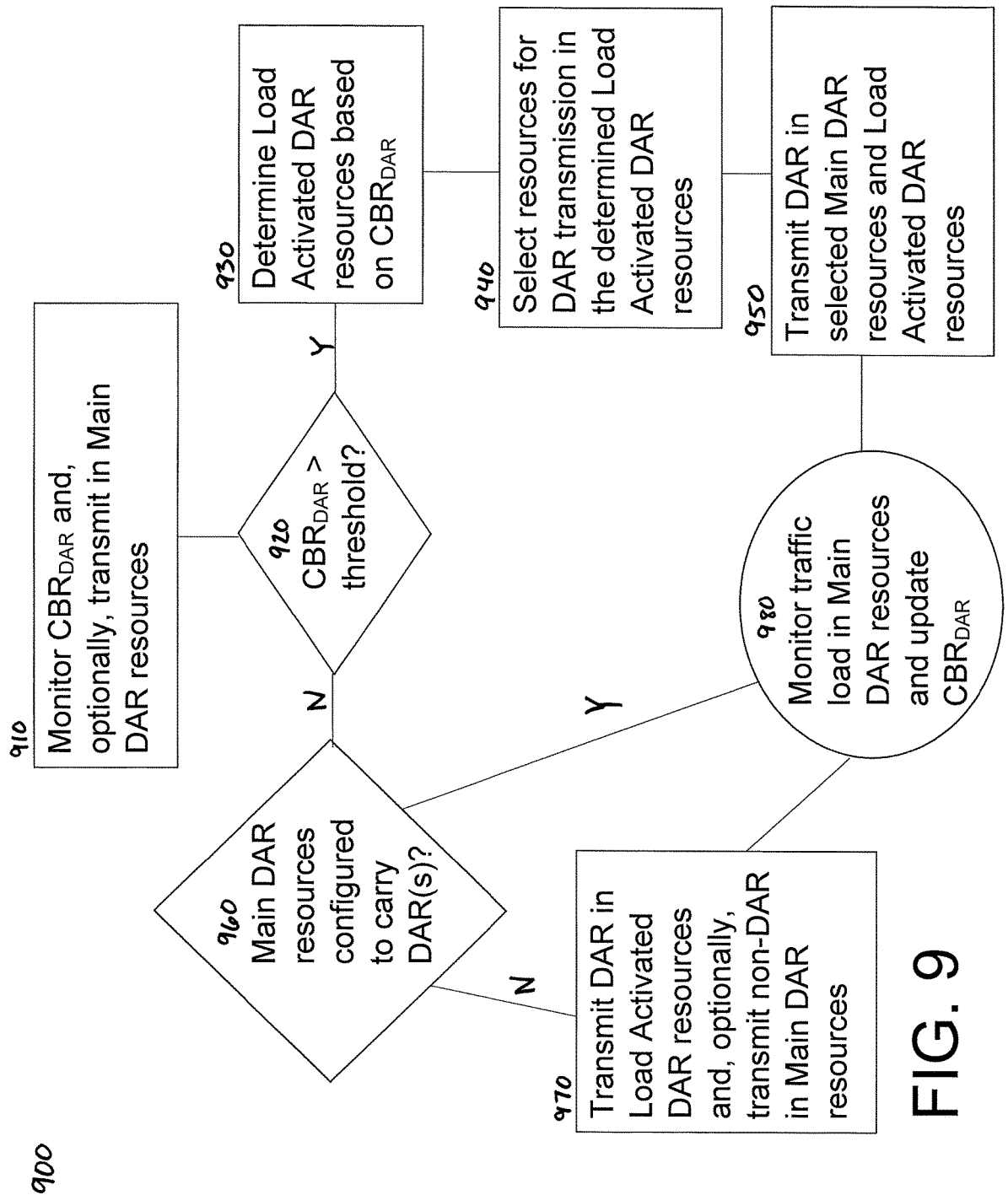
FIG. 9 is flowchart illustrating steps as described herein.

Referring now to FIG. 9, illustrated is the behavior of a DAR initiator SL UE. At 910, the Tx UE may monitor or measure the traffic load (e.g. CBR) in the main DAR resources, e.g. denoted as $CBR_{DAR}$. For example, this monitoring may be performed by measuring the sidelink RSSI at each resource of the main DAR resources. In an example embodiment, the measurement at each resource of the main DAR resources may last for a period of time, following an average moving window approach. This time period may be (pre-) configured. The manner in which the Tx UE monitors or measures the traffic load in the main DAR resources may be influenced by whether or not the main DAR resources are configured to carry DAR/parts of DAR. For example, if the main DAR resources are configured to carry non-DAR signals/sequences, measuring the traffic load may comprise counting the number of detected layer-1 signals/sequences. If the main DAR resources are configured to carry at least part of the DAR, measuring the traffic load may involve considering the CBR due to transmission of DAR messages.

In addition, at 910, the Tx UE may also transmit DAR in main DAR resources, if the main DAR resources are configured to carry DARs. Alternatively, if main DAR resources are determined to be configured to carry only signals/sequences/part of the transmission associated with DAR other than complete DAR, the Tx UE may transmit a signal/sequence/part of the transmission associated with DAR at 910, accordingly. Whether or not the main DAR resources are configured to carry DAR/partial DAR, the Tx UE may transmit something in the main DAR resources. In other words, in an example embodiment, measurements of the traffic load at 910 do not impact whether the Tx UE performs transmission at 910.

At 920, the Tx UE may determine whether the measured traffic load is above at least one threshold. This may be determined with reference to a traffic load offset, as described above. This determination may be performed before the next set of DAR resources (i.e. main DAR resources and/or load activated DAR resources). While not illustrated in FIG. 9, the Tx UE may transmit a message to one or more Rx UEs. If the $CBR_{DAR}$>threshold, the Tx UE may determine the set(s) of the load activated DAR resources, based on $CBR_{DAR}$, to be activated (i.e. used for transmission) at 930. If the load activated DAR resources include one or multiple sets of resources configured to carry DAR, one or more of those sets may be selected for activation. While not illustrated in FIG. 9, the Tx UE may send a message to one or more Rx UEs indicating the set(s) of load activated DAR resources to be activated for transmission/reception once they have been determined at 930.

At 940, the Tx UE may select resource(s) for DAR transmission from the determined/activated load activated DAR resources. The Tx UE may also select resource(s) for DAR transmission from the main DAR resources, if the main DAR resources are configured to transmit DAR and have not already been used to transmit DAR at 910. At 950, the Tx UE may transmit DAR in the selected resources. If the main DAR resources are configured to carry DARs. The Tx UE may also transmit the same DAR in one or more selected resources from the main DAR resources. Otherwise, only a signal/sequence/part of the transmission associated with DAR is transmitted in a selected resource from the main DAR resources. It should be noted that, if the Tx UE transmits DAR in the main DAR resources at 910, transmission of DAR in main DAR resources at 950 may be unnecessary. In that case, at 950 DAR may be transmitted in selected load activated DAR resources only.

After the transmission is performed, the Tx UE may monitor the traffic load in the main DAR resources and update $CBR_{DAR}$ accordingly, at 980. It should be noted that while FIG. 9 illustrates a single loop of an example embodiment for simplicity, the step at 980 may be considered the same as the step at 910, such that the loop is repeated.

If, at 920, the Tx UE determines that $CBR_{DAR}$<threshold, at 960, further action of the Tx UE may depend upon whether the main DAR resources are configured to carry (complete) DARs. If main DAR resources are configured to carry (complete) DAR the Tx UE may have transmitted DAR in the main DAR resources at 910. If transmitting DAR in the main DAR resources has already occurred at 910, the Tx UE may proceed to step 980 and monitor the traffic load in the main DAR resources and update $CBR_{DAR}$ accordingly. After the transmission is performed, the Tx UE may monitor the traffic load in the main DAR resources and update $CBR_{DAR}$ accordingly, at 980. As noted above, step 980 may be the same as step 910, such that the loop cycles through again. If main DAR resources are configured to carry only signals/sequences/part of the transmission associated with DAR other than complete DAR, at 970 the Tx UE may transmit the remaining part of the transmission associated with DAR in one configured/default set of load activated DAR resources. It should be noted that the Tx UE may also transmit DAR in the main DAR resources at 970. After the transmission is performed, the Tx UE may monitor the traffic load in the main DAR resources and update $CBR_{DAR}$ accordingly, at 980. As noted above, step 980 may be the same as step 910, such that the loop cycles through again.

It should be noted that while FIGS. 8 and 9 describe SL UE performing either a transmission or reception role, a SL UE may perform both transmitter and receiver roles at the same time. Accordingly, a SL UE may perform actions the same as or similar to the steps of FIGS. 8 and 9 at a same time.

As the main DAR resources are dedicated for initiating the SL DRX alignment procedure, this set of resources should be configured as small as possible. A technical effect of example embodiments of the present disclosure may be enablement of reservation of a minimal amount of static resources (i.e. the main DAR resources) for the DAR message transmission. Only based on measured traffic load from main DAR resources will the load activated DAR resources be activated; otherwise, the load activated DAR resources may be used for other purposes, e.g. other sidelink traffic, uplink and/or downlink transmissions. In other words, example embodiments of the present disclosure ensure that minimal sidelink resources are dedicated to the exchange of DAR while allowing the allocated resources to be scaled up flexibly with the observed/measured sidelink traffic load in a local area.

Figure 10:
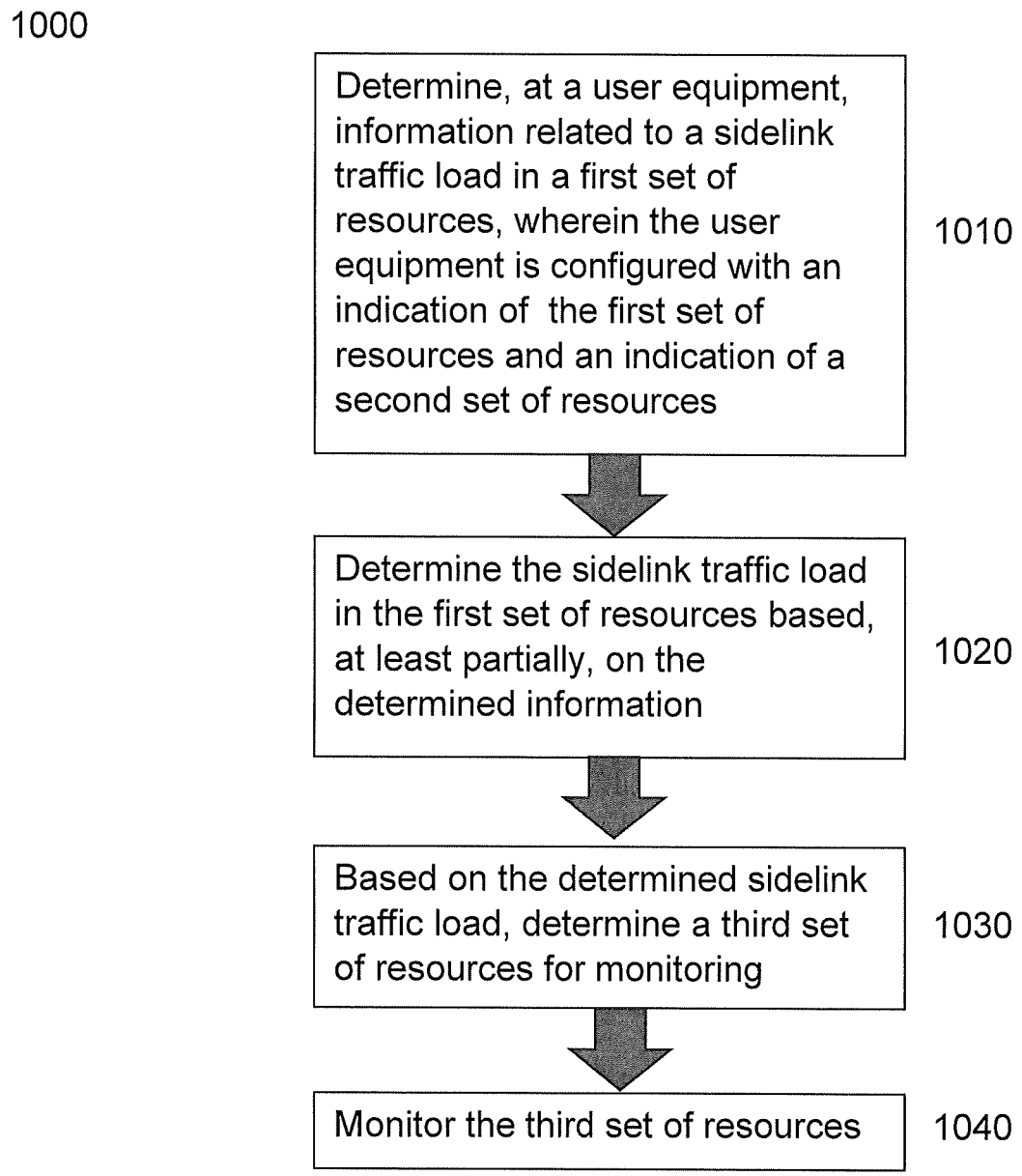
FIG. 10 is a flowchart illustrating steps as described herein.

FIG. 10 illustrates the potential steps of an example method 1000. The example method 1000 may include determining, at a user equipment, information related to a sidelink traffic load in a first set of resources, wherein the user equipment is configured with an indication of the first set of resources and an indication of a second set of resources, 1010. The example method may further include determining the sidelink traffic load in the first set of resources based, at least partially, on the determined information, 1020. The example method may further include, based on the determined sidelink traffic load, determining a third set of resources for monitoring, 1030. The example method may further include monitoring the third set of resources, 1040.

Figure 11:
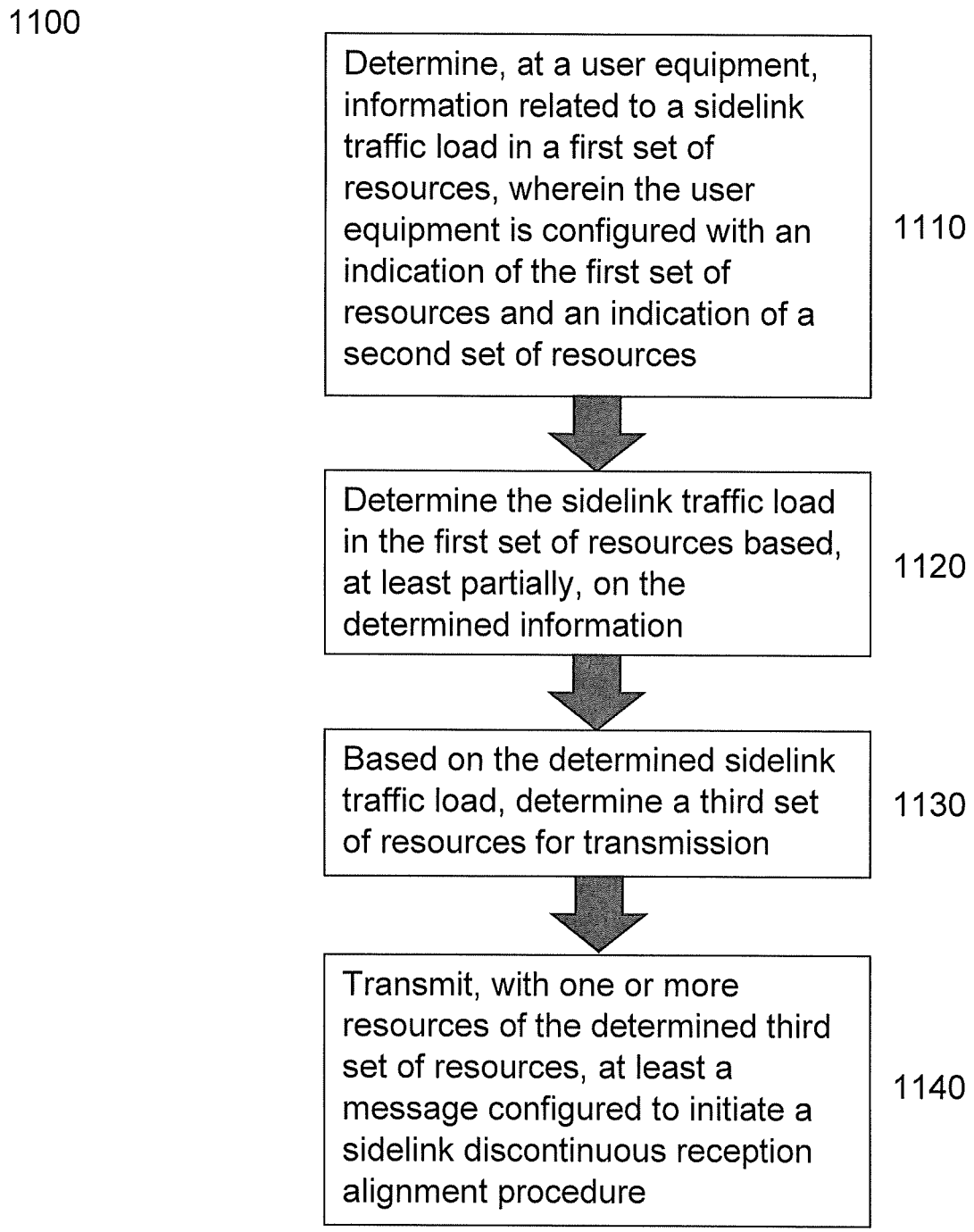
FIG. 11 is a flowchart illustrating steps as described herein.

FIG. 11 illustrates the potential steps of an example method 1000. The example method 1100 may include determining, at a user equipment, information related to a sidelink traffic load in a first set of resources, wherein the user equipment is configured with an indication of the first set of resources and an indication of a second set of resources, 1110. The example method may further include determining the sidelink traffic load in the first set of resources based, at least partially, on the determined information, 1120. The example method may further include, based on the determined sidelink traffic load, determining a third set of resources for transmission, 1130. The example method may further include transmitting, with one or more resources of the determined third set of resources, at least a message configured to initiate a sidelink discontinuous reception alignment procedure, 1140.

In accordance with one aspect, an example method may be provided comprising: determining, at a user equipment, information related to a sidelink traffic load in a first set of resources, wherein the user equipment may be configured with an indication of the first set of resources and an indication of a second set of resources; determining the sidelink traffic load in the first set of resources based, at least partially, on the determined information; based on the determined sidelink traffic load, determining a third set of resources for monitoring; and monitoring the third set of resources.

The example method may further comprise: comparing the information related to the sidelink traffic load with at least one threshold, or receiving, at the user equipment, a result of a comparison of the sidelink traffic load with the at least one threshold.

The example method may further comprise: determining the third set of resources for the monitoring based on a result of the comparing of the information related to the sidelink traffic load with the at least one threshold or the received result.

The comparing of the information related to the sidelink traffic load with the at least one threshold may comprise comparing the information related to the sidelink traffic load with a combination of at least one traffic load offset value and the at least one threshold.

The determined third set of resources may comprise at least the first set of resources and at least part of the second set of resources, where the at least one threshold is met or exceeded or the received result indicates to include the at least part of the second set of resources in the determined third set of resources.

The comparing of the information related to the sidelink traffic load with the at least one threshold may comprise: comparing the determined sidelink traffic load with a plurality of thresholds of varied values of traffic load size, and determining a largest value of the plurality of thresholds exceeded by the determined sidelink traffic load, wherein the plurality of thresholds may be associated with respective subsets of resources belonging to the second set of resources, and wherein the determining of the third set of resources for monitoring may comprise determining one or more subsets of the second set of resources associated with the largest determined threshold.

The determined third set of resources may comprise the first set of resources and not at least part of the second set of resources, where the at least one threshold is not met or exceeded or the received result indicates to not include the at least part of the second set of resources in the determined third set of resources.

The at least one threshold may comprise a smallest value of the at least one threshold.

The information related to the sidelink traffic load may comprise one of: a channel busy ratio, a message received from a different user equipment, occupied resources of the first set of resources, at least one received signal strength indicator for resources of the first set of resources, a level of the sidelink traffic load in the first set of resources, or a number of received physical layer signals or sequences.

The user equipment may be configured with the indication of the first set of resources and the indication of the second set of resources through at least one of: pre-configuration of the user equipment, dedicated signaling received at the user equipment, or at least one broadcasted system information block received at the user equipment.

The example method may further comprise: determining that the first set of resources are not configured to carry a full message for initiating a sidelink discontinuous reception alignment procedure. For example, the first set of resources may be determined to comprise a set of resources insufficient to carry a full message for initiating a sidelink discontinuous reception alignment procedure. The first set of resources may be configured to carry part of the message for initiating a sidelink discontinuous reception alignment procedure, instead of the whole or full message. In one example, such configuration may be due to there being insufficient resources in the first set of resources for carrying the whole or full message. In another example, resource(s) from the first set of resources may be sufficient to carry the whole or full message, while the configuration may determine/indicate that the first set of resources only carry Layer-1 signals/sequences/part of the message, instead of the whole or full message.

The determined third set of resources may comprise at least the first set of resources and at least one subset of the second set of resources, wherein the first set of resources may be monitored to at least one of: derive one or more signals or sequences, or detect a part of a transmission for initiating the sidelink discontinuous reception alignment procedure, wherein the at least one subset of the second set of resources may be monitored to detect one of: the full message for initiating the sidelink discontinuous reception alignment procedure, or a different part of the transmission for initiating the sidelink discontinuous reception alignment procedure.

The monitoring of the determined third set of resources further may comprise monitoring the determined third set of resources during a next sidelink discontinuous reception on duration period.

The example method may further comprise: performing sidelink discontinuous reception alignment based on the monitoring of the determined third set of resources.

In accordance with one example embodiment, an apparatus may comprise: at least one processor; and at least one memory including computer program code; the at least one memory and the computer program code configured to, with the at least one processor, cause the apparatus to: determine information related to a sidelink traffic load in a first set of resources, wherein the apparatus may be configured with an indication of the first set of resources and an indication of a second set of resources; determine the sidelink traffic load in the first set of resources based, at least partially, on the determined information; based on the determined sidelink traffic load, determine a third set of resources for monitoring; and monitor the third set of resources.

The example apparatus may be configured to compare the information related to the sidelink traffic load with at least one threshold, or receive a result of a comparison of the sidelink traffic load with the at least one threshold.

The example apparatus may be configured to determine the third set of resources for the monitoring based on a result of the comparing of the information related to the sidelink traffic load with the at least one threshold or the received result.

The comparing of the information related to the sidelink traffic load with the at least one threshold may comprise comparing the information related to the sidelink traffic load with a combination of at least one traffic load offset value and the at least one threshold.

The determined third set of resources may comprise at least the first set of resources and at least part of the second set of resources, where the at least one threshold may be met or exceeded or the received result indicates to include the at least part of the second set of resources in the determined third set of resources.

The comparing of the information related to the sidelink traffic load with the at least one threshold may comprise the apparatus being configured to compare the determined sidelink traffic load with a plurality of thresholds of varied values of traffic load size, and determine a largest value of the plurality of thresholds exceeded by the determined sidelink traffic load, wherein the plurality of thresholds may be associated with respective subsets of resources belonging to the second set of resources, and wherein determining the third set of resources for monitoring may comprise apparatus being configured to cause the apparatus to determine one or more subsets of the second set of resources associated with the largest determined threshold.

The determined third set of resources may comprise the first set of resources and not at least part of the second set of resources, where the at least one threshold is not met or exceeded or the received result indicates to not include the at least part of the second set of resources in the determined third set of resources.

The at least one threshold may comprise a smallest value of the at least one threshold.

The information related to the sidelink traffic load may comprise one of: a channel busy ratio, a message received from a different apparatus, occupied resources of the first set of resources, at least one received signal strength indicator for resources of the first set of resources, a level of the sidelink traffic load in the first set of resources, or a number of received physical layer signals or sequences.

The apparatus may be configured with the indication of the first set of resources and the indication of the second set of resources through at least one of: pre-configuration of the apparatus, dedicated signaling received at the apparatus, or at least one broadcasted system information block received at the apparatus.

The apparatus may be configured to determine that the first set of resources are not configured to carry a full message for initiating a sidelink discontinuous reception alignment procedure.

The determined third set of resources may comprise at least the first set of resources and at least one subset of the second set of resources, wherein the first set of resources are monitored to at least one of: derive one or more signals or sequences, or detect a part of a transmission for initiating the sidelink discontinuous reception alignment procedure, wherein the at least one subset of the second set of resources may be monitored to detect one of: the full message for initiating the sidelink discontinuous reception alignment procedure, or a different part of the transmission for initiating the sidelink discontinuous reception alignment procedure.

The apparatus may be configured to monitor the determined third set of resources during a next sidelink discontinuous reception on duration period.

The apparatus may be configured to perform sidelink discontinuous reception alignment based on monitoring the determined third set of resources.

In accordance with one example embodiment, an apparatus may comprise means for performing: determining information related to a sidelink traffic load in a first set of resources, wherein the apparatus is configured with an indication of the first set of resources and an indication of a second set of resources; determining the sidelink traffic load in the first set of resources based, at least partially, on the determined information; based on the determined sidelink traffic load, determining a third set of resources for monitoring; and monitoring the third set of resources.

The apparatus may further comprise means for: comparing the information related to the sidelink traffic load with at least one threshold, or receiving a result of a comparison of the sidelink traffic load with the at least one threshold.

The apparatus may further comprise means for determining the third set of resources for the monitoring based on a result of the comparing of the information related to the sidelink traffic load with the at least one threshold or the received result.

The means configured to perform comparing the information related to the sidelink traffic load with the at least one threshold may comprise means for comparing the information related to the sidelink traffic load with a combination of at least one traffic load offset value and the at least one threshold.

The determined third set of resources may comprise at least the first set of resources and at least part of the second set of resources, where the at least one threshold is met or exceeded or the received result indicates to include the at least part of the second set of resources in the determined third set of resources.

The means for comparing the information related to the sidelink traffic load with the at least one threshold may comprise means for: comparing the determined sidelink traffic load with a plurality of thresholds of varied values of traffic load size, and determining a largest value of the plurality of thresholds exceeded by the determined sidelink traffic load, wherein the plurality of thresholds may be associated with respective subsets of resources belonging to the second set of resources, and wherein the means for determining the third set of resources for monitoring may comprise means for determining one or more subsets of the second set of resources associated with the largest determined threshold.

The determined third set of resources may comprise the first set of resources and not at least part of the second set of resources, where the at least one threshold is not met or exceeded or the received result indicates to not include the at least part of the second set of resources in the determined third set of resources.

The at least one threshold may comprise a smallest value of the at least one threshold.

The information related to the sidelink traffic load may comprise one of: a channel busy ratio, a message received from a different apparatus, occupied resources of the first set of resources, at least one received signal strength indicator for resources of the first set of resources, a level of the sidelink traffic load in the first set of resources, or a number of received physical layer signals or sequences.

The apparatus may be configured with the indication of the first set of resources and the indication of the second set of resources through at least one of: pre-configuration of the apparatus, dedicated signaling received at the apparatus, or at least one broadcasted system information block received at the apparatus.

The apparatus may further comprise means for determining that the first set of resources are not configured to carry a full message for initiating a sidelink discontinuous reception alignment procedure.

The determined third set of resources may comprise at least the first set of resources and at least one subset of the second set of resources, wherein the first set of resources may be monitored to at least one of: derive one or more signals or sequences, or detect a part of a transmission for initiating the sidelink discontinuous reception alignment procedure, wherein the at least one subset of the second set of resources may be monitored to detect one of: the full message for initiating the sidelink discontinuous reception alignment procedure, or a different part of the transmission for initiating the sidelink discontinuous reception alignment procedure.

The means for monitoring the determined third set of resources may further comprise means for monitoring the determined third set of resources during a next sidelink discontinuous reception on duration period.

The apparatus may further comprise means for performing sidelink discontinuous reception alignment based on the monitoring of the determined third set of resources.

In accordance with one example embodiment, a non-transitory computer-readable medium comprising program instructions stored thereon which, when executed with at least one processor, cause the at least one processor to: determine, at a user equipment, information related to a sidelink traffic load in a first set of resources, wherein the user equipment may be configured with an indication of the first set of resources and an indication of a second set of resources; determine the sidelink traffic load in the first set of resources based, at least partially, on the determined information; based on the determined sidelink traffic load, determine a third set of resources for monitoring; and monitor the third set of resources.

The non-transitory computer-readable medium may be further configured to: compare the information related to the sidelink traffic load with at least one threshold, or receive, at the user equipment, a result of a comparison of the sidelink traffic load with the at least one threshold.

The non-transitory computer-readable medium may be further configured to determine the third set of resources for the monitoring based on comparing the information related to the sidelink traffic load with the at least one threshold or the received result.

Comparing the information related to the sidelink traffic load with the at least one threshold may comprise the non-transitory computer-readable medium being configured to compare the information related to the sidelink traffic load with a combination of at least one traffic load offset value and the at least one threshold.

The determined third set of resources may comprise at least the first set of resources and at least part of the second set of resources, where the at least one threshold is met or exceeded or the received result indicates to include the at least part of the second set of resources in the determined third set of resources.

Comparing the information related to the sidelink traffic load with the at least one threshold may comprise the non-transitory computer-readable medium being configured to compare the determined sidelink traffic load with a plurality of thresholds of varied values of traffic load size, and determine a largest value of the plurality of thresholds exceeded by the determined sidelink traffic load, wherein the plurality of thresholds may be associated with respective subsets of resources belonging to the second set of resources, and wherein determining the third set of resources for monitoring may comprise may comprise the non-transitory computer-readable medium being configured to determine one or more subsets of the second set of resources associated with the largest determined threshold.

The determined third set of resources may comprise the first set of resources and not at least part of the second set of resources, where the at least one threshold is not met or exceeded or the received result indicates to not include the at least part of the second set of resources in the determined third set of resources.

The at least one threshold may comprise a smallest value of the at least one threshold.

The information related to the sidelink traffic load may comprise one of: a channel busy ratio, a message received from a different user equipment, occupied resources of the first set of resources, at least one received signal strength indicator for resources of the first set of resources, a level of the sidelink traffic load in the first set of resources, or a number of received physical layer signals or sequences.

The user equipment may be configured with the indication of the first set of resources and the indication of the second set of resources through at least one of: pre-configuration of the user equipment, dedicated signaling received at the user equipment, or at least one broadcasted system information block received at the user equipment.

The non-transitory computer-readable medium may be further configured to determine that the first set of resources are not configured to carry a full message for initiating a sidelink discontinuous reception alignment procedure.

The determined third set of resources may comprise at least the first set of resources and at least one subset of the second set of resources, and the non-transitory computer-readable medium may be further configured to: monitor the first set of resources to at least one of: derive one or more signals or sequences, or detect a part of a transmission for initiating the sidelink discontinuous reception alignment procedure, monitor the at least one subset of the second set of resources to detect one of: the full message for initiating the sidelink discontinuous reception alignment procedure, or a different part of the transmission for initiating the sidelink discontinuous reception alignment procedure.

Monitoring the determined third set of resources may further comprise the non-transitory computer-readable medium being further configured to monitor the determined third set of resources during a next sidelink discontinuous reception on duration period.

The non-transitory computer-readable medium may be further configured to perform sidelink discontinuous reception alignment based on the monitoring of the determined third set of resources.

In accordance with one aspect, an example method may be provided comprising: determining, at a user equipment, information related to a sidelink traffic load in a first set of resources, wherein the user equipment may be configured with an indication of the first set of resources and an indication of a second set of resources; determining the sidelink traffic load in the first set of resources based, at least partially, on the determined information; based on the determined sidelink traffic load, determining a third set of resources for transmission; and transmitting, with one or more resources of the determined third set of resources, at least a message for initiating a sidelink discontinuous reception alignment procedure.

The example method may further comprise: comparing the information related to the sidelink traffic load with at least one threshold.

The example method may further comprise: determining the third set of resources for the transmission based on a result of the comparing of the information related to the sidelink traffic load with the at least one threshold.

The comparing of the information related to the sidelink traffic load with the at least one threshold may comprise comparing the information related to the sidelink traffic load with a combination of at least one traffic load offset value and the at least one threshold.

The determined third set of resources may comprise at least the first set of resources and at least part of the second set of resources where the at least one threshold is met or exceeded.

The comparing of the information related to the sidelink traffic load with the at least one threshold may comprise: comparing the determined sidelink traffic load with a plurality of thresholds of varied values of traffic load size, and determining a largest value of the plurality of thresholds exceeded by the determined sidelink traffic load, wherein the plurality of thresholds may be associated with respective subsets of resources belonging to the second set of resources, and wherein the determining of the third set of resources for transmission may comprise determining one or more subsets of the second set of resources associated with the largest determined threshold.

The determined third set of resources may comprise the first set of resources and not at least part of the second set of resources where the at least one threshold is not met or exceeded.

The at least one threshold may comprise a smallest value of the at least one threshold.

The information related to the sidelink traffic load may comprise one of: a channel busy ratio, a message received from a different user equipment, occupied resources of the first set of resources, at least one received signal strength indicator for resources of the first set of resources, a level of the sidelink traffic load in the first set of resources, or a number of received physical layer signals or sequences.

The user equipment may be configured with the indication of the first set of resources and the indication of the second set of resources through at least one of: pre-configuration of the user equipment, dedicated signaling received with the user equipment, or at least one broadcasted system information block received at the user equipment.

The example method may further comprise: determining that the first set of resources are not configured to carry all of the message for initiating the sidelink discontinuous reception alignment procedure.

The determined third set of resources may comprise at least the first set of resources and at least one subset of the second set of resources, wherein at least one resource of the first set of resources may be used for transmission of at least one of: a pre-configured signal or sequence, or a part of a transmission for initiating the sidelink discontinuous reception alignment procedure, wherein at least one resource of the at least one subset of the second set of resources may be used for transmission of one of: all of the message for initiating the sidelink discontinuous reception alignment procedure, or a different part of the transmission for initiating the sidelink discontinuous reception alignment procedure.

The pre-configured signal or sequence may comprise a Zadoff-Chu sequence with a configured cyclic shift, and the part of the message for initiating the sidelink discontinuous reception alignment procedure may comprise at least a part of a sidelink control information associated with the message transmission.

The example method may further comprise: transmitting data packets with at least one subset of resources of the second set of resources which the determined third set of resources for transmission does not comprise. The data packets may comprise normal traffic.

The example method may further comprise: transmitting the determined sidelink traffic load to another user equipment.

In accordance with one example embodiment, an apparatus may comprise: at least one processor; and at least one memory including computer program code; the at least one memory and the computer program code configured to, with the at least one processor, cause the apparatus to: determine information related to a sidelink traffic load in a first set of resources, wherein the apparatus may be configured with an indication of the first set of resources and an indication of a second set of resources; determine the sidelink traffic load in the first set of resources based, at least partially, on the determined information; based on the determined sidelink traffic load, determine a third set of resources for transmission; and transmit, with one or more resources of the determined third set of resources, at least a message for initiating a sidelink discontinuous reception alignment procedure.

The example apparatus may be further configured to compare the information related to the sidelink traffic load with at least one threshold.

The example apparatus may be further configured to determine the third set of resources for the transmission based on a result of the comparing of the information related to the sidelink traffic load with the at least one threshold.

Comparing the information related to the sidelink traffic load with the at least one threshold may comprise the apparatus being further configured to compare the information related to the sidelink traffic load with a combination of at least one traffic load offset value and the at least one threshold.

The determined third set of resources may comprise at least the first set of resources and at least part of the second set of resources where the at least one threshold is met or exceeded.

Comparing the information related to the sidelink traffic load with the at least one threshold may comprise the apparatus being further configured to: compare the determined sidelink traffic load with a plurality of thresholds of varied values of traffic load size, and determine a largest value of the plurality of thresholds exceeded by the determined sidelink traffic load, wherein the plurality of thresholds are associated with respective subsets of resources belonging to the second set of resources, and wherein determining the third set of resources for transmission comprises the apparatus being further configured to determine one or more subsets of the second set of resources associated with the largest determined threshold.

The determined third set of resources may comprise the first set of resources and not at least part of the second set of resources where the at least one threshold is not met or exceeded.

The at least one threshold may comprise a smallest value of the at least one threshold.

The information related to the sidelink traffic load may comprise one of: a channel busy ratio, a message received from a different apparatus, occupied resources of the first set of resources, at least one received signal strength indicator for resources of the first set of resources, a level of the sidelink traffic load in the first set of resources, or a number of received physical layer signals or sequences.

The example apparatus may be configured with the indication of the first set of resources and the indication of the second set of resources through at least one of: pre-configuration of the apparatus, dedicated signaling received with the apparatus, or at least one broadcasted system information block received at the apparatus.

The example apparatus may be further configured to determine that the first set of resources are not configured to carry all of the message for initiating the sidelink discontinuous reception alignment procedure.

The determined third set of resources may comprise at least the first set of resources and at least one subset of the second set of resources, wherein at least one resource of the first set of resources is used for transmission of at least one of: a pre-configured signal or sequence, or a part of a transmission for initiating the sidelink discontinuous reception alignment procedure, wherein at least one resource of the at least one subset of the second set of resources is used for transmission of one of: all of the message for initiating the sidelink discontinuous reception alignment procedure, or a different part of the transmission for initiating the sidelink discontinuous reception alignment procedure.

The pre-configured signal or sequence may comprise a Zadoff-Chu sequence with a configured cyclic shift, and wherein the part of the message for initiating the sidelink discontinuous reception alignment procedure may comprise at least a part of a sidelink control information associated with the message transmission.

The example apparatus may be further configured to transmit data packets with at least one subset of resources of the second set of resources which the determined third set of resources for transmission does not comprise.

The example apparatus may be further configured to, with the at least one processor, cause the apparatus to transmit the determined sidelink traffic load to another apparatus.

In accordance with one example embodiment, an apparatus may comprise means for performing: determining, at the apparatus, information related to a sidelink traffic load in a first set of resources, wherein the apparatus may be configured with an indication of the first set of resources and an indication of a second set of resources; determining the sidelink traffic load in the first set of resources based, at least partially, on the determined information; based on the determined sidelink traffic load, determining a third set of resources for transmission; and transmitting, with one or more resources of the determined third set of resources, at least a message for initiating a sidelink discontinuous reception alignment procedure.

The example apparatus may further comprise means for comparing the information related to the sidelink traffic load with at least one threshold.

The example apparatus may further comprise means for determining the third set of resources for the transmission based on a result of the comparing of the information related to the sidelink traffic load with the at least one threshold.

The means for comparing the information related to the sidelink traffic load with the at least one threshold may comprise means for comparing the information related to the sidelink traffic load with a combination of at least one traffic load offset value and the at least one threshold.

The determined third set of resources may comprise at least the first set of resources and at least part of the second set of resources where the at least one threshold is met or exceeded.

The means for comparing the information related to the sidelink traffic load with the at least one threshold may comprise means for: comparing the determined sidelink traffic load with a plurality of thresholds of varied values of traffic load size, and determining a largest value of the plurality of thresholds exceeded by the determined sidelink traffic load, wherein the plurality of thresholds are associated with respective subsets of resources belonging to the second set of resources, and wherein the means for determining the third set of resources for transmission may comprise means for determining one or more subsets of the second set of resources associated with the largest determined threshold.

The determined third set of resources may comprise the first set of resources and not at least part of the second set of resources where the at least one threshold is not met or exceeded.

The at least one threshold may comprise a smallest value of the at least one threshold.

The information related to the sidelink traffic load comprises one of: a channel busy ratio, a message received from a different apparatus, occupied resources of the first set of resources, at least one received signal strength indicator for resources of the first set of resources, a level of the sidelink traffic load in the first set of resources, or a number of received physical layer signals or sequences.

The example apparatus may be configured with the indication of the first set of resources and the indication of the second set of resources through at least one of: pre-configuration of the apparatus, dedicated signaling received with the apparatus, or at least one broadcasted system information block received at the apparatus.

The example apparatus may further comprise means for determining that the first set of resources are not configured to carry all of the message for initiating the sidelink discontinuous reception alignment procedure.

The determined third set of resources may comprise at least the first set of resources and at least one subset of the second set of resources, wherein at least one resource of the first set of resources is used for transmission of at least one of: a pre-configured signal or sequence, or a part of a transmission for initiating the sidelink discontinuous reception alignment procedure, wherein at least one resource of the at least one subset of the second set of resources is used for transmission of one of: all of the message for initiating the sidelink discontinuous reception alignment procedure, or a different part of the transmission for initiating the sidelink discontinuous reception alignment procedure.

The pre-configured signal or sequence may comprise a Zadoff-Chu sequence with a configured cyclic shift, and the part of the message for initiating the sidelink discontinuous reception alignment procedure may comprise at least a part of a sidelink control information associated with the message transmission.

The example apparatus may further comprise means for transmitting data packets with at least one subset of resources of the second set of resources which the determined third set of resources for transmission does not comprise.

The example apparatus may further comprise means for transmitting the determined sidelink traffic load to another user equipment.

In accordance with one example embodiment, a non-transitory computer-readable medium comprising program instructions stored thereon which, when executed with at least one processor, cause the at least one processor to: determine, at a user equipment, information related to a sidelink traffic load in a first set of resources, wherein the user equipment may be configured with an indication of the first set of resources and an indication of a second set of resources; determine the sidelink traffic load in the first set of resources based, at least partially, on the determined information; based on the determined sidelink traffic load, determine a third set of resources for transmission; and transmit, with one or more resources of the determined third set of resources, at least a message for initiating a sidelink discontinuous reception alignment procedure.

The example non-transitory computer-readable medium may further comprise program instructions stored thereon which, when executed with the at least one processor, cause the at least one processor to compare the information related to the sidelink traffic load with at least one threshold.

The example non-transitory computer-readable medium may further comprise program instructions stored thereon which, when executed with the at least one processor, cause the at least one processor to determine the third set of resources for the transmission based on a result of the comparing of the information related to the sidelink traffic load with the at least one threshold.

Comparing the information related to the sidelink traffic load with the at least one threshold may comprise the program instructions stored thereon are configured to, when executed with the at least one processor, further cause the at least one processor to compare the information related to the sidelink traffic load with a combination of at least one traffic load offset value and the at least one threshold.

The determined third set of resources may comprise at least the first set of resources and at least part of the second set of resources where the at least one threshold is met or exceeded.

Comparing the information related to the sidelink traffic load with the at least one threshold may comprise the program instructions stored thereon are configured to, when executed with the at least one processor, further cause the at least one processor to: compare the determined sidelink traffic load with a plurality of thresholds of varied values of traffic load size, and determine a largest value of the plurality of thresholds exceeded by the determined sidelink traffic load, wherein the plurality of thresholds may be associated with respective subsets of resources belonging to the second set of resources, and wherein determining the third set of resources for transmission may comprise the program instructions stored thereon are configured to, when executed with the at least one processor, further cause the at least one processor to determine one or more subsets of the second set of resources associated with the largest determined threshold.

The determined third set of resources may comprise the first set of resources and not at least part of the second set of resources where the at least one threshold is not met or exceeded.

The at least one threshold may comprise a smallest value of the at least one threshold.

The information related to the sidelink traffic load may comprise one of: a channel busy ratio, a message received from a different user equipment, occupied resources of the first set of resources, at least one received signal strength indicator for resources of the first set of resources, a level of the sidelink traffic load in the first set of resources, or a number of received physical layer signals or sequences.

The user equipment may be configured with the indication of the first set of resources and the indication of the second set of resources through at least one of: pre-configuration of the user equipment, dedicated signaling received with the user equipment, or at least one broadcasted system information block received at the user equipment.

The example non-transitory computer-readable medium may further comprise program instructions stored thereon which, when executed with the at least one processor, cause the at least one processor to determine that the first set of resources are not configured to carry all of the message for initiating the sidelink discontinuous reception alignment procedure.

The determined third set of resources may comprise at least the first set of resources and at least one subset of the second set of resources, and the example non-transitory computer-readable medium may further comprise program instructions stored thereon which, when executed with the at least one processor, cause the at least one processor to use at least one resource of the first set of resources for transmission of at least one of: a pre-configured signal or sequence, or a part of a transmission for initiating the sidelink discontinuous reception alignment procedure, and may further comprise program instructions stored thereon which, when executed with the at least one processor, cause the at least one processor to use at least one resource of the at least one subset of the second set of resources for transmission of one of: all of the message for initiating the sidelink discontinuous reception alignment procedure, or a different part of the transmission for initiating the sidelink discontinuous reception alignment procedure.

The pre-configured signal or sequence may comprise a Zadoff-Chu sequence with a configured cyclic shift, and the part of the message for initiating the sidelink discontinuous reception alignment procedure may comprise at least a part of a sidelink control information associated with the message transmission.

The example non-transitory computer-readable medium may further comprise program instructions stored thereon which, when executed with the at least one processor, cause the at least one processor to transmit data packets with at least one subset of resources of the second set of resources which the determined third set of resources for transmission does not comprise.

The example non-transitory computer-readable medium may further comprise program instructions stored thereon which, when executed with the at least one processor, cause the at least one processor to transmit the determined sidelink traffic load to another user equipment.

In accordance with one example embodiment, a computer program comprising instructions stored thereon for performing at least the following: determining, at a user equipment, information related to a sidelink traffic load in a first set of resources, wherein the user equipment may be configured with an indication of the first set of resources and an indication of a second set of resources; determining the sidelink traffic load in the first set of resources based, at least partially, on the determined information; based on the determined sidelink traffic load, determining a third set of resources for monitoring; and monitoring the third set of resources.

In accordance with one example embodiment, a computer program comprising instructions stored thereon for performing at least the following: determining, at a user equipment, information related to a sidelink traffic load in a first set of resources, wherein the user equipment may be configured with an indication of the first set of resources and an indication of a second set of resources; determining the sidelink traffic load in the first set of resources based, at least partially, on the determined information; based on the determined sidelink traffic load, determining a third set of resources for transmission; and transmitting, with one or more resources of the determined third set of resources, at least a message for initiating a sidelink discontinuous reception alignment procedure.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. An apparatus comprising:
   at least one processor; and
   at least one non-transitory memory and computer program code, wherein the at least one memory and the computer program code are configured to, with the at least one processor, cause the apparatus to:
   determine information related to a sidelink traffic load in a first set of resources, wherein the apparatus is configured with an indication of the first set of resources and an indication of a second set of resources;
   determine the sidelink traffic load in the first set of resources based, at least partially, on the determined information;
   compare the information related to the sidelink traffic load with at least one threshold, or receive a result of a comparison of the sidelink traffic load with the at least one threshold, wherein the comparing comprises comparing the information related to the sidelink traffic load with a combination of at least one traffic load offset value and the at least one threshold;
   based on the determined sidelink traffic load and at least one of: a result of the comparing of the information related to the sidelink traffic load with the at least one threshold or the received result, determine a third set of resources for monitoring; and
   monitor the third set of resources.

2. The apparatus of claim 1, wherein the determined third set of resources comprises at least the first set of resources and at least part of the second set of resources, where the at least one threshold is met or exceeded or the received result indicates to include the at least part of the second set of resources in the determined third set of resources.

3. The apparatus of claim 1, wherein the comparing of the information related to the sidelink traffic load with the at least one threshold comprises the at least one memory and the computer program code are further configured to, with the at least one processor, cause the apparatus to:

compare the determined sidelink traffic load with a plurality of thresholds of varied values of traffic load size, and determine a largest value of the plurality of thresholds exceeded by the determined sidelink traffic load, wherein the plurality of thresholds are associated with respective subsets of resources belonging to the second set of resources, wherein the determining the third set of resources for monitoring comprises the at least one memory and the computer program code are further configured to, with the at least one processor, cause the apparatus to determine one or more subsets of the second set of resources associated with the largest determined threshold.

4. The apparatus of claim 1, wherein the determined third set of resources comprises the first set of resources and not at least part of the second set of resources, where the at least one threshold is not met or exceeded or the received result indicates to not include the at least part of the second set of resources in the determined third set of resources.

5. The apparatus of claim 1, wherein the information related to the sidelink traffic load comprises one of:
a channel busy ratio,
a message received from a different apparatus,
occupied resources of the first set of resources,
at least one received signal strength indicator for resources of the first set of resources,
a level of the sidelink traffic load in the first set of resources, or
a number of received physical layer signals or sequences.

6. The apparatus of claim 1, wherein the apparatus is configured with the indication of the first set of resources and the indication of the second set of resources through at least one of:
pre-configuration of the apparatus,
dedicated signaling received at the apparatus, or
at least one broadcasted system information block received at the apparatus.

7. The apparatus of claim 1, wherein the at least one memory and the computer program code are further configured to, with the at least one processor, cause the apparatus to determine that the first set of resources are not configured to carry a full message for initiating a sidelink discontinuous reception alignment procedure.

8. The apparatus of claim 1, wherein the determined third set of resources comprises at least the first set of resources and at least one subset of the second set of resources, wherein the first set of resources are monitored to at least one of:
derive one or more signals or sequences, or
detect a part of a transmission for initiating the sidelink discontinuous reception alignment procedure,
wherein the at least one subset of the second set of resources are monitored to detect one of:
a full message for initiating the sidelink discontinuous reception alignment procedure, or
a different part of the transmission for initiating the sidelink discontinuous reception alignment procedure.

9. An apparatus comprising:
at least one processor; and
at least one non-transitory memory and computer program code, wherein the at least one memory and the computer program code are configured to, with the at least one processor, cause the apparatus to:
determine information related to a sidelink traffic load in a first set of resources, wherein the apparatus is configured with an indication of the first set of resources and an indication of a second set of resources;
determine the sidelink traffic load in the first set of resources based, at least partially, on the determined information;
compare the information related to the sidelink traffic load with at least one threshold;
based on the determined sidelink traffic load and a result of the comparing the information related to the sidelink traffic load with the at least one threshold, determine a third set of resources for transmission; and
transmit, with one or more resources of the determined third set of resources, at least a message for initiating a sidelink discontinuous reception alignment procedure.

10. The apparatus of claim 9, wherein the comparing the information related to the sidelink traffic load with the at least one threshold comprises the at least one memory and the computer program code are further configured to, with the at least one processor, cause the apparatus to compare the information related to the sidelink traffic load with a combination of at least one traffic load offset value and the at least one threshold.

11. The apparatus of claim 9, wherein the determined third set of resources comprises at least the first set of resources and at least part of the second set of resources, where the at least one threshold is met or exceeded.

12. The apparatus of claim 9, wherein comparing the information related to the sidelink traffic load with the at least one threshold comprises the at least one memory and the computer program code are further configured to, with the at least one processor, cause the apparatus to:
compare the determined sidelink traffic load with a plurality of thresholds of varied values of traffic load size, and
determine a largest value of the plurality of thresholds exceeded by the determined sidelink traffic load, wherein the plurality of thresholds are associated with respective subsets of resources belonging to the second set of resources,
wherein determining the third set of resources for transmission comprises the at least one memory and the computer program code are further configured to, with the at least one processor, cause the apparatus to determine one or more subsets of the second set of resources associated with the largest determined threshold.

13. The apparatus of claim 9, wherein the information related to the sidelink traffic load comprises one of:
a channel busy ratio,
a message received from a different apparatus,
occupied resources of the first set of resources,
at least one received signal strength indicator for resources of the first set of resources,
a level of the sidelink traffic load in the first set of resources, or
a number of received physical layer signals or sequences.

14. An apparatus comprising:
at least one processor; and
at least one non-transitory memory and computer program code, wherein the at least one memory and the computer program code are configured to, with the at least one processor, cause the apparatus to:
determine information related to a sidelink traffic load in a first set of resources, wherein the apparatus is configured with an indication of the first set of resources and an indication of a second set of resources;

determine the sidelink traffic load in the first set of resources based, at least partially, on the determined information;

based on the determined sidelink traffic load, determine a third set of resources for monitoring; and monitor the third set of resources, wherein the determined third set of resources comprises at least the first set of resources and at least one subset of the second set of resources, and wherein the first set of resources are monitored to at least one of:

derive one or more signals or sequences, or detect a part of a transmission for initiating the sidelink discontinuous reception alignment procedure, wherein the at least one subset of the second set of resources are monitored to detect one of:

a full message for initiating the sidelink discontinuous reception alignment procedure, or a different part of the transmission for initiating the sidelink discontinuous reception alignment procedure.

15. An apparatus comprising:
at least one processor; and
at least one non-transitory memory and computer program code, wherein the at least one memory and the computer program code are configured to, with the at least one processor, cause the apparatus to:
determine information related to a sidelink traffic load in a first set of resources, wherein the apparatus is configured with an indication of the first set of resources and an indication of a second set of resources;
determine the sidelink traffic load in the first set of resources based, at least partially, on the determined information;
determine that the first set of resources are not configured to carry a full message for initiating a sidelink discontinuous reception alignment procedure;
based on the determined sidelink traffic load, determine a third set of resources for monitoring; and
monitor the third set of resources.

16. An apparatus comprising:
at least one processor; and
at least one non-transitory memory and computer program code, wherein the at least one memory and the computer program code are configured to, with the at least one processor, cause the apparatus to:
determine information related to a sidelink traffic load in a first set of resources, wherein the apparatus is configured with an indication of the first set of resources and an indication of a second set of resources;
determine the sidelink traffic load in the first set of resources based, at least partially, on the determined information;
compare the information related to the sidelink traffic load with at least one threshold, wherein the comparing comprises comparing the information related to the sidelink traffic load with a combination of at least one traffic load offset value and the at least one threshold;
based on the determined sidelink traffic load and a result of the comparing the information related to the sidelink traffic load with the at least one threshold, determine a third set of resources for transmission; and
transmit, with one or more resources of the determined third set of resources, at least a message for initiating a sidelink discontinuous reception alignment procedure.

17. The apparatus of claim 16, wherein the determined third set of resources comprises at least the first set of resources and at least part of the second set of resources, where the at least one threshold is met or exceeded.

18. The apparatus of claim 16, wherein the comparing the information related to the sidelink traffic load with the at least one threshold comprises the at least one memory and the computer program code are further configured to, with the at least one processor, cause the apparatus to:
compare the determined sidelink traffic load with a plurality of thresholds of varied values of traffic load size, and
determine a largest value of the plurality of thresholds exceeded by the determined sidelink traffic load, wherein the plurality of thresholds are associated with respective subsets of resources belonging to the second set of resources,
wherein determining the third set of resources for transmission comprises the at least one memory and the computer program code are further configured to, with the at least one processor, cause the apparatus to determine one or more subsets of the second set of resources associated with the largest determined threshold.

19. The apparatus of claim 16, wherein the information related to the sidelink traffic load comprises one of:
a channel busy ratio,
a message received from a different apparatus,
occupied resources of the first set of resources,
at least one received signal strength indicator for resources of the first set of resources,
a level of the sidelink traffic load in the first set of resources, or
a number of received physical layer signals or sequences.

20. The apparatus of claim 16, wherein the apparatus is configured with the indication of the first set of resources and the indication of the second set of resources through at least one of:
pre-configuration of the apparatus,
dedicated signaling received with the apparatus, or
at least one broadcasted system information block received at the apparatus.

* * * * *